(12) United States Patent
Hara et al.

(10) Patent No.: US 10,625,771 B2
(45) Date of Patent: Apr. 21, 2020

(54) VEHICLE WITH LEAN CONTROL

(71) Applicant: YAMAHA HATSUDOKI KABUSHIKI KAISHA, Iwata-shi, Shizuoka (JP)

(72) Inventors: Nobuo Hara, Iwata (JP); Yukihide Fukuhara, Iwata (JP); Takeshi Toyota, Iwata (JP); Tatsuya Nagata, Iwata (JP)

(73) Assignee: YAMAHA HATSUDOKI KABUSHIKI KAISHA, Iwata-Shi, Shizuoka (JP)

(*) Notice: Subject to any disclaimer, the term of this patent is extended or adjusted under 35 U.S.C. 154(b) by 189 days.

(21) Appl. No.: 15/983,236

(22) Filed: May 18, 2018

(65) Prior Publication Data
US 2018/0265156 A1 Sep. 20, 2018

Related U.S. Application Data

(63) Continuation of application No. PCT/JP2016/084167, filed on Nov. 17, 2016.

(30) Foreign Application Priority Data

Nov. 20, 2015 (JP) .................. 2015-228014

(51) Int. Cl.
B62K 5/10 (2013.01)
B62K 5/08 (2006.01)
(Continued)

(52) U.S. Cl.
CPC ......... B62D 5/046 (2013.01); B60G 17/0163 (2013.01); B62D 6/00 (2013.01);
(Continued)

(58) Field of Classification Search
CPC . B62D 5/046; B62D 6/00; B62D 9/02; B60G 17/0163; B60G 2300/45;
(Continued)

(56) References Cited

U.S. PATENT DOCUMENTS 8,762,003 B2 * 6/2014 Mercier ............. B60G 17/0157
180/210
10,207,762 B2 * 2/2019 Takenaka .................. B62K 5/01
(Continued)

FOREIGN PATENT DOCUMENTS

JP 2009-083651 A 4/2009
JP 2012-051460 A 3/2012
(Continued)

Primary Examiner — Brian P Sweeney
(74) Attorney, Agent, or Firm — Rabin & Berdo, P.C.

(57) ABSTRACT

A vehicle with two front wheels includes an EPS that makes it difficult for a rider to feel a sensation of physical disorder while realizing a vertical angle suppression function. The EPS is configured to apply an assisting force to a steering effort transmission mechanism. The vehicle further includes an EPL configured to apply a turning effort to a cross member of a link mechanism to turn the cross member relative to a vehicle body frame, and a control unit configured to control the EPS and the EPL. The control unit determines an EPS command value that determines a magnitude of output torque of the EPS and an EPL command value that determines a magnitude of output torque of the EPL according to a physical quantity including at least a vehicle speed and a vertical angle, and controls a ratio of the EPL command value to the EPS command value.

17 Claims, 10 Drawing Sheets

(51) Int. Cl.
  *B62K 21/00* (2006.01)
  *G05D 3/12* (2006.01)
  *B62D 5/04* (2006.01)
  *B60G 17/016* (2006.01)
  *B62D 6/00* (2006.01)
  *G05D 1/08* (2006.01)
  *B62K 5/05* (2013.01)
  *B62D 9/02* (2006.01)

(52) U.S. Cl.
  CPC ............... *B62K 5/08* (2013.01); *B62K 5/10* (2013.01); *G05D 1/0891* (2013.01); *G05D 3/125* (2013.01); *B60G 2202/42* (2013.01); *B60G 2300/45* (2013.01); *B60G 2400/208* (2013.01); *B60G 2400/41* (2013.01); *B60G 2400/42* (2013.01); *B62D 9/02* (2013.01); *B62K 5/05* (2013.01); *B62K 21/00* (2013.01); *B62K 2207/02* (2013.01)

(58) Field of Classification Search
  CPC .......... B60G 2400/208; B60G 2400/41; B60G 2400/42; B60G 2202/42; G05D 1/0891; G05D 3/125; B62K 5/08; B62K 5/10; B62K 2207/02; B62K 5/05; B62K 21/00
  USPC .......................................................... 701/37
  See application file for complete search history.

(56) References Cited

U.S. PATENT DOCUMENTS

| 2008/0238005 A1 | 10/2008 | James |
| 2012/0310478 A1 | 12/2012 | Carabelli et al. |
| 2015/0158360 A1 | 6/2015 | Uebayashi et al. |

FOREIGN PATENT DOCUMENTS

| JP | 2012076490 A | 4/2012 |
| JP | 2012-166637 A | 9/2012 |
| JP | 2013-071691 A | 4/2013 |
| JP | 2013-112236 A | 6/2013 |
| JP | 2014091506 A | 5/2014 |
| WO | WO-2011/059456 A1 | 5/2011 |
| WO | WO-2014-065396 A1 | 5/2014 |

* cited by examiner

VEHICLE WITH LEAN CONTROL

CROSS-REFERENCE TO RELATED APPLICATIONS

This application is a continuation of International Application PCT/JP2016/084167 filed on Nov. 17, 2016, which claims priority from Japanese Patent Application No. 2015-228014 filed on Nov. 20, 2015. The contents of each of the identified applications are entirely incorporated herein by reference.

BACKGROUND

Technical Field

The present invention relates to a vehicle including a vehicle body frame that can lean and two front wheels.

Background Art

A vehicle including a vehicle body frame that can lean and two front wheels that are aligned side by side in a left-and-right direction is known through Patent Literature 1 (identified further on) or the like. This vehicle is a vehicle in which a phenomenon of self-steering occurs where when the vehicle is caused to lean to the right, the front wheels attempt to turn clockwise when the vehicle is viewed from the above, whereas when the vehicle is caused to lean to the left, the front wheels attempt to turn counterclockwise when the vehicle is viewed from the above.

In such a vehicle, it is possible to change the position of a contact point of the right front wheel with the road surface, the position of the left front wheel with the road surface and the position of the center of gravity of the vehicle by changing the direction of the two front wheels. Deviating the position of the center of gravity to the left or right with respect to a longitudinal axis (an imaginary line connecting a transversely central point between the two front wheels and a transversely central point of a rear wheel) of the vehicle by changing the positional relationship between the two contact points and the center of gravity enables the vehicle to lean to the left or right. In the following description, when a vehicle is viewed from the front thereof, an acute angle formed between an imaginary line that extends in an up-and-down direction of a vehicle body frame and a vertical direction is to be referred to as a vertical angle. With a great vertical angle, the vehicle is leaning greatly in a left-and-right direction of the vehicle. With the vehicle standing upright, the vertical angle becomes 0 degree.

PRIOR ART LITERATURE

Patent Literature

[Patent Literature 1]International Patent Publication No. 2014/065396

Incidentally, in a vehicle having two front wheels like the vehicle described in Patent Literature 1, when compared with a vehicle having one front wheel, the number of contact points with a road surface is increased, which then requires a rider's great steering effort. Therefore, the inventor has reached an idea of installing on a vehicle an electric power steering system (EPS) that can assist a rider with his or her steering effort.

Further, the inventor has come to notice that a vertical angle suppression function can be added by the use of the EPS. The vertical angle suppression function means a function of suppressing a behavior of the vehicle that increases the vertical angle by applying a steering effort to reduce the vertical angle by the use of the EPS when the vehicle behaves to increase the vertical angle. Specifically speaking, when attempting to suppress a behavior of the vehicle that increases the vertical angle to the right while the vehicle is running, turning a right front wheel and a left front wheel clockwise (steering the right front wheel and the left front wheel to the right) when the vehicle is viewed from the above can allow a force to reduce the vertical angle to act on the vehicle.

When attempting to suppress a behavior of the vehicle that increases the vertical angle to the left while the vehicle is running, turning the right front wheel and the left front wheel counterclockwise (steering the right front wheel and the left front wheel to the left) when the vehicle is viewed from the above can allow a force to reduce the vertical angle to act on the vehicle.

However, when attempting to realize the vertical angle suppression function by the use of the EPS, an EPS operation performed to suppress the vertical angle acts so that a rider feels it as a disturbance to a handlebar, often causing the rider to feel a sensation of physical disorder. For example, there is a case where the EPS attempts to operate while the rider does not operate a handlebar. Alternatively, there is a case where the EPS attempts to move the handlebar more than an intended operation of the handlebar by the rider when the rider is operating the handlebar. Further, there is a case where the EPS attempts to resist an intended operation of the handlebar by the rider while the rider attempts to operate the handlebar.

SUMMARY

An object of the invention is to provide a vehicle with two front wheels that has installed thereon an EPS that makes it difficult for a rider to feel a sensation of physical disorder while realizing a vertical angle suppression function.

MEANS FOR ACHIEVING THE OBJECT

According to the invention, (1) there is provided a vehicle having:

a vehicle body frame that leans to the right of the vehicle when the vehicle turns right and leans to the left of the vehicle when the vehicle turns left;

a right front wheel that is provided on the right of the vehicle body frame and that is provided to be able to turn about a right steering axis that extends in an up-and-down direction of the vehicle body frame;

a left front wheel that is provided on the left of the vehicle body frame and that is provided to be able to turn about a left steering axis that extends in the up-and-down direction of the vehicle body frame;

a link mechanism having a cross member that is supported to be able to turn about a link axis that extends in a front-and-rear direction of the vehicle body frame to change a relative position of the right front wheel and the left front wheel in the up-and-down direction of the vehicle body frame according to a degree to which the vehicle body frame leans;

a steering effort transmission mechanism configured to transmit a first steering effort inputted into a steering effort input unit by a rider to the right front wheel and the left front wheel;

a steering effort application device (Electric Power Steering System: EPS) configured to apply a second steering effort to the steering effort transmission mechanism by a first actuator;

a turning effort application device (Electric Power Leaning System: EPL) configured to apply a turning effort to the cross member of the link mechanism by a second actuator to turn the cross member relative to the vehicle body frame; and a control unit configured to control at least one of the steering effort application device and the turning effort application device to generate at least one of the second steering effort and the turning effort to suppress a behavior that increases a vertical angle, wherein the control unit is adapted to determine an EPS command value and an EPL command value according to a physical quantity that includes at least a vehicle speed and a vertical angle, the EPS command value determining a magnitude of output torque of the first actuator and the EPL command value determining a magnitude of output torque of the second actuator, and wherein with the vertical angle being any other angle than 0 degree and the physical quantity excluding the vehicle speed staying constant, the control unit increases a ratio a/b of the EPS command value "a" to the EPL command value "b" as the vehicle speed increases.

The inventor has studied the situation where the rider feels a sensation of physical disorder by the vertical angle suppression function using the EPS, and noticed that the situation tends to occur in a low speed range. The inventor has found out the fact that the vehicle speed and a limit angle at which the vehicle can maintain the vertical angle are in a relationship shown in FIG. 7 with a turning radius staying constant.

FIG. 7 is a graph showing a relationship between the vehicle speed and the limit angle. As shown in FIG. 7, the limit angle is determined according to the vehicle speed. The limit angle becomes smaller as the vehicle speed decreases. Namely, in a situation where the vehicle speed is low, the frequency at which the rider feels a sensation of physical disorder is increased since the vertical angle suppression function is desired to be put into operation frequently.

To suppress a behavior that increases the vertical angle, it is effective to steer the vehicle more in the direction in which the vehicle is leaning. For example, in a case where the vehicle behaves to increase the vertical angle to the right, it is effective to steer the vehicle more to the right, whereas in a case where the vehicle behaves to increase the vertical angle to the left, it is effective to steer the vehicle more to the left. As this occurs, the degree to which the vertical angle changes in relation to an operation of the steering effort input unit becomes lower in the low speed range than in a high speed range. Thus, even though the rider attempts to change the vertical angle by the same degree both in the low and high speed ranges, the steering effort input unit is operated more in quantity in the low speed range than in the high speed range. The inventor has found out the fact that with the vehicle having the EPS installed thereon, the rider tends to feel a sensation of physical disorder more in the low speed range where the steering effort input unit needs to be operated more in quantity than in the high speed range due to the aforesaid fact that the rider tends to feel a sensation of physical disorder more as the assisting torque by the EPS increases more.

The vehicle with the two front wheels has installed thereon the link mechanism configured to allow the vehicle to lean. The link mechanism includes the cross member. The cross member is supported so as to turn about the link axis that extends in the front-and-rear direction of the vehicle body frame and changes the relative position between the right front wheel and the left front wheel in the up-and-down direction of the vehicle body frame according to the degree to which the vehicle body frame leans. The inventor has noticed that a turning effort can be exerted on the cross member to suppress the behavior that increases the vertical angle. Then, the inventor has come to the idea of installing on the vehicle the turning effort application device or the Electric Power Leaning System (EPL) configured to apply a turning effort to the cross member so as to suppress the behavior that increases the vertical angle.

Using the EPL in the way described above can change the vertical angle separately from operating the steering effort input unit. When compared with a vehicle equipped with no EPL, with the vehicle equipped with the EPL, the vertical angle can be controlled by operating the steering effort input unit slightly.

For example, in a case where the vertical angle increases to the right, the cross member turns counterclockwise relative to the vehicle body frame when the cross member is viewed from the rear in a front-and-rear direction of the vehicle. Then, when the vertical angle increases to the right, the EPL applies a turning effort to the cross member so as to turn the cross member clockwise when the cross member is viewed from the rear in the front-and-rear direction of the vehicle so that the vertical angle is reduced. On the contrary, when the vertical angle increases to the left, the EPL applies a turning effort to the cross member so as to turn the cross member counterclockwise when the cross member is viewed from the rear in the front-and-rear direction of the vehicle so that the vertical angle is reduced.

As described above, in a case where the vehicle speed is relatively low, attempting to suppress the behavior that increases the vertical angle only by the EPS tends to cause the rider to feel a sensation of physical disorder. Therefore, in this embodiment, the behavior of the vehicle that increases the vertical angle is suppressed by outputting greater torque from the EPL than from the EPS by setting the EPL command value at the greater value in the low speed range. It is made difficult for the rider to feel a sensation of physical disorder in the low speed range in the way described above. As this occurs, the ratio a/b between the EPS command value "a" and the EPL command value "b" becomes relatively small. On the contrary, in a case where the vehicle speed is relatively high, the rider is caused to feel a sensation of physical disorder with difficulty even though the behavior that increases the vertical angle is attempted to be suppressed only by the EPS.

Therefore, in this embodiment, the EPL command value is not set at such a great value in the high speed range. As this occurs, the ratio a/b between the EPS command value "a" and the EPL command value "b" becomes relatively great. The control unit sets the EPS command value "a" and the EPL command value "b" in the way described above, and hence, the control unit increases the ratio a/b according the vehicle speed.

In this way, the EPL applies the turning effort to the cross member and does not apply any force directly to the steering effort input unit. Thus, it is made difficult for the rider to feel a sensation of physical disorder when he or she controls the steering effort input unit. In the vehicle according to the invention, there is a tendency that the ratio of the EPS output to the EPL output becomes greater in the low speed range where the rider tends to feel a sensation of physical disorder when attempting to suppress behavior the that increases the vertical angle only by the EPS than in the high speed range. This makes it difficult for the rider to feel a sensation of physical disorder.

(2) In the vehicle according to the invention, the control unit may control the ratio a/b to change gradually as the vehicle speed changes.

According to the vehicle configured as described under (2) above, the ratio a/b between the output torque of the first actuator and the output torque of the second actuator changes moderately according to the vehicle speed. Thus, it is made difficult for the user to feel a sensation of physical disorder.

(3) In the vehicle according to the invention, the control unit may increase an output of the first actuator as the vehicle speed increases when the vehicle speed stays within at least a predetermined range.

According to the vehicle configured as described under (3) above, the second steering effort (the assisting torque) to the steering effort input unit increases as the vehicle speed increases. The assisting torque to the steering effort input unit acts to cancel a gyro effect (a phenomenon in which a force is generated to cause the front wheels to maintain their postures) that increases as the vehicle speed increases. This enables the rider to operate the steering effort input unit with a light operation feeling even in the high speed range. In a four-wheeled vehicle that does not lean when the vehicle turns, normally, an EPS is installed in an attempt to reduce a great steering effort required when attempting to operate a steering wheel while the vehicle is at a halt (to improve static steering torque). Thus, in the four-wheeled vehicle, on the contrary to the control according to the invention, the EPS is set so that a great assisting torque is inputted into the steering wheel or the steering effort input unit in a low vehicle speed range.

(4) In the vehicle according to the invention, when the vehicle body frame leans while the vehicle is running, the vehicle may change to increase or decrease a steering angle of the steering effort input unit.

According to the vehicle configured as described under (4) above, the leaning of the vehicle body frame and the steering angle of the steering effort input unit are related so as to act on each other. In the vehicle configured in the way described above, providing both the EPS and the EPL enables one to compensate for the other or both of the EPS and the EPL to cooperate with each other to control the behavior of the vehicle.

(5) In the vehicle according to the invention, the control unit may determine an output of the first actuator according to the vertical angle.

The steering effort by the rider to reduce the leaning angle of the vehicle becomes greater as the vertical angle becomes greater. Thus, in the vehicle configured as described under (5) above, the EPS command value is determined so that the EPS command value becomes greater as the vertical angle becomes greater.

(6) In the vehicle according to the invention, the physical quantity may include at least one of a vertical angle speed and a vertical angle acceleration, and the control unit may determine an output of the first actuator according to at least one of the vertical angle speed and the vertical angle acceleration.

According to the vehicle configured as described under (6) above, the resistance to the leaning action of the vehicle can be reduced. Namely, it is possible to determine an output of the first actuator so that a behavior of the steering effort input unit attributed to an output of the first actuator by the control unit does not cause the rider to feel a sensation of physical disorder when the rider causes the vehicle to lean.

(7) In the vehicle according to the invention, while the vehicle is running, when the vehicle body frame leans to the right, the vehicle may attempt to change to increase a steering angle of the steering effort input unit in a clockwise direction when the vehicle is viewed from the above, whereas when the vehicle body frame leans to the left, the vehicle may attempt to change to increase a steering angle of the steering effort input unit in a counterclockwise direction when the vehicle is viewed from the above.

According to the vehicle configured as described under (7) above, for example, when the vehicle body frame leans to the right while the vehicle is running, the vehicle tends to turn right. Then, the steering effort input unit also turns clockwise, attempting to turn the vehicle to the right further. This characteristic of the steering effort input unit in which the steering effort input unit turns further in the direction in which the vehicle leans when the vehicle is caused to lean is referred to as a self-steering characteristic. The vertical angle is reduced by a centrifugal force that acts on the vehicle when the vehicle turns. The invention that includes the function of controlling the vertical angle is preferable when applied to a vehicle having the self-steering characteristic because the self-steering characteristic can be strengthened or, on the contrary, weakened according to situations. In such a situation in which both the output torque of the first actuator and the output torque of the second actuator become zero, the rider can control the vehicle as he or she controls many normal vehicles with no such actuator.

DETAILED DESCRIPTION

Figure 1:
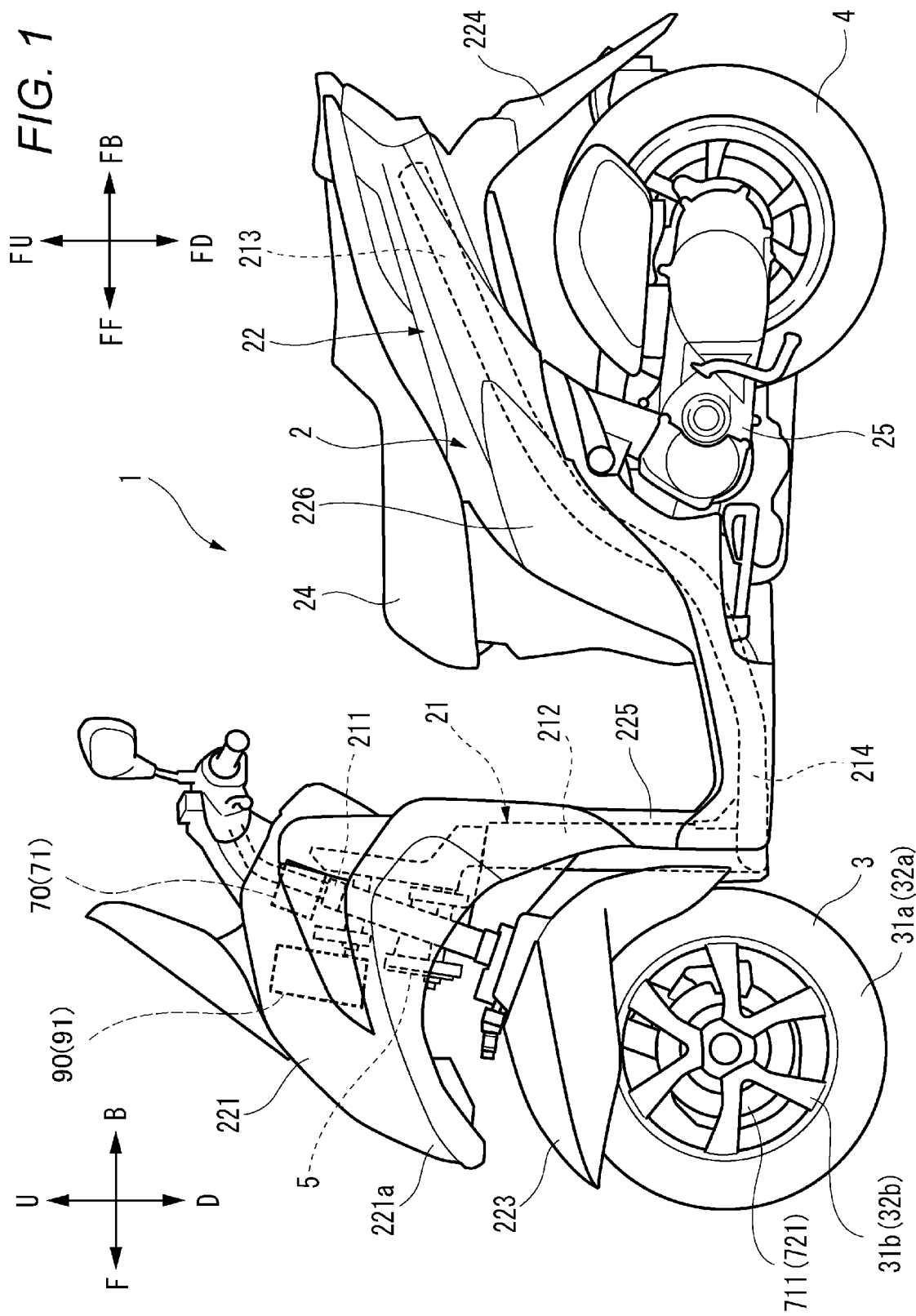
FIG. 1 is an overall side view of a vehicle according to an embodiment of the invention.

Referring to the accompanying drawings, an illustrative non-limiting embodiment will be described in detail below.

In the accompanying drawings, an arrow F denotes a front or forward direction of a vehicle. An arrow B denotes a rear or rearward direction of the vehicle. An arrow U denotes an upward direction of the vehicle. An arrow D denotes a downward direction of the vehicle. An arrow R denotes a right or rightward direction of the vehicle. An arrow L denotes a left or leftward direction of the vehicle.

A vehicle turns with a vehicle body frame caused to lean in a left-and-right direction of the vehicle relative to a vertical direction. Then, in addition to the directions based on the vehicle, directions based on the vehicle body frame are defined. In the accompanying drawings, an arrow FF denotes a front or forward direction of the vehicle body frame. An arrow FB denotes a rear or rearward direction of the vehicle body frame. An arrow FU denotes an upward direction of the vehicle body frame. An arrow FD denotes a downward direction of the vehicle body frame. An arrow FR denotes a right or rightward direction of the vehicle body frame. An arrow FL denotes a left or leftward direction of the vehicle body frame.

In this description, a "front-and-rear direction of the vehicle body frame," a "left-and-right direction of the vehicle body frame" and an "up-and-down direction of the vehicle body frame" mean a front-and-rear direction, a left-and-right direction and an up-and-down direction based on the vehicle body frame as viewed from a rider who rides on the vehicle. "On or to a side of the vehicle body frame" means directly on or to the right or left of the vehicle body frame.

When referred to in this description, an expression reading "something extends in the front-and-rear direction of the vehicle body frame" includes a situation in which something extends in the front-and-rear direction of the vehicle body frame while being inclined in relation to the front-and-rear direction of the vehicle body frame and means that something extends with a gradient which is closer to the front-and-rear direction of the vehicle body frame rather than the left-and-right direction and the up-and-down direction of the vehicle body frame.

In this description, an expression reading "something extends in the left-and-right direction of the vehicle body frame" includes a situation in which something extends in the left-and-right direction of the vehicle body frame while being inclined in relation to the left-and-right direction of the vehicle body frame and means that something extends with a gradient which is closer to the left-and-right direction of the vehicle body frame rather than the front-and-rear direction and the up-and-down direction of the vehicle body frame.

In this description, an expression reading "something extends in the up-and-down direction of the vehicle body frame" includes a situation in which something extends in the up-and-down direction of the vehicle body frame while being inclined in relation to the up-and-down direction of the vehicle body frame and means that something extends with a gradient which is closer to the up-and-down direction of the vehicle body frame rather than the front-and-rear direction and the left-and-right direction of the vehicle body frame.

In this description, an "upright state of the vehicle" or the "vehicle stands upright" means a state in which the vehicle remains not steered and the up-and-down direction of the vehicle body frame coincides with the vertical direction. In this state, the directions based on the vehicle coincide with the directions based on the vehicle body frame. When the vehicle is turning with the body frame caused to lean to the left or right from the vertical direction, the left-and-right direction of the vehicle does not coincide with the left-and-right direction of the vehicle body frame. The up-and-down direction of the vehicle does not coincide with the up-and-down direction of the vehicle body frame. However, the front-and-rear direction of the vehicle coincides with the front-and-rear direction of the vehicle body frame.

In this description, "rotation or rotating" means that a member is displaced at an angle of 360 degrees or more about a center axis thereof. In this description, "turn or turning" means that a member is displaced at an angle of less than 360 degrees about a center axis thereof. In this embodiment, a vehicle having two front wheels and one rear wheel will be described as an example of a vehicle.

<Overall Configuration>

FIG. 1 is a side view of the whole of a vehicle 1 as viewed from the left of the vehicle 1. An unloaded state of the vehicle 1 means an upright state of the vehicle 1 with its front wheels neither steered nor caused to lean in such a state that no rider rides on and no fuel is filled in the vehicle 1.

As shown in FIG. 1, the vehicle 1 includes a vehicle main body portion 2, a pair of left and right front wheels 3 (refer to FIG. 2), a rear wheel 4, and a link mechanism 5. The vehicle main body portion 2 includes a vehicle body frame 21, a vehicle body cover 22, a seat 24 and a power unit 25.

The vehicle body frame 21 has a headpipe 211, a down frame 212, an under frame 214 and a rear frame 213. In FIG. 1, in the vehicle body frame 21, portions that are hidden by the vehicle body cover 22 are shown by broken lines. The vehicle body frame 21 supports the power unit 25, the seat 24 and the like. The power unit 25 has a drive source such as an engine, an electric motor or the like, a transmission and the like.

The headpipe 211 is disposed at a front portion of the vehicle 1. When the vehicle 1 is viewed from a side thereof, the headpipe 211 is disposed to be slightly inclined relative to a vertical direction so that an upper portion is positioned slightly further rearwards than a lower portion thereof. A link mechanism 5 is disposed on the periphery of the headpipe 211. A steering shaft 60 is inserted into the head pipe 211 so as to turn therein. The headpipe 211 supports the link mechanism 5. The headpipe 211, which is part of the vehicle body frame 21, can lean to the right of the vehicle 1 when the vehicle 1 turns right, whereas the headpipe 211 can lean to the left of the vehicle 1 when the vehicle 1 turns left.

The down frame 212 is connected to the headpipe 211. The down frame 212 is disposed behind the headpipe 211 and extends along an up-and-down direction. The under frame 214 is connected to a lower portion of the down frame 212. The under frame 214 extends rearwards from the lower portion of the down frame 212. The rear frame 213 extends rearwards and upwards directly behind the under frame 214. The rear frame 213 supports the seat 24, the power unit 25, a tail lamp and the like.

The vehicle body frame 21 is covered by the vehicle body cover 22. The vehicle body cover 22 has a front cover 221, a pair of left and right front fenders 223, a leg shield 225, a center cover 226 and a rear fender 224.

The front cover 221 is positioned directly ahead of the seat 24. The front cover 221 covers at least a part of the link mechanism 5. The front cover 221 has a front portion 221a that is disposed ahead of the link mechanism 5. When the vehicle 1 in an unloaded state is viewed from the side thereof, the front portion 221a of the front cover 221 is provided above the front wheels 3. When the vehicle 1 in the unloaded state is viewed from the side thereof, the front portion 221a of the front cover 221 is disposed behind front ends of the front wheels 3. The leg shield 225 is disposed directly below the front cover 221 and directly ahead of the seat 24. The center cover 226 is disposed so as to cover a circumference of the rear frame 213.

The pair of left and right front fenders 223 (see FIG. 2) are disposed directly below the front cover 221 and directly above the pair of left and right front wheels 3, respectively. The rear fender 224 is disposed directly above a rear portion of the rear wheel 4.

The pair of left and right front wheels 3 are disposed below the headpipe 211 and below the front cover 221 with the vehicle 1 remaining in an unloaded state. The rear wheel 4 is disposed below the center cover 226 and the rear fender 224.

Figure 2:
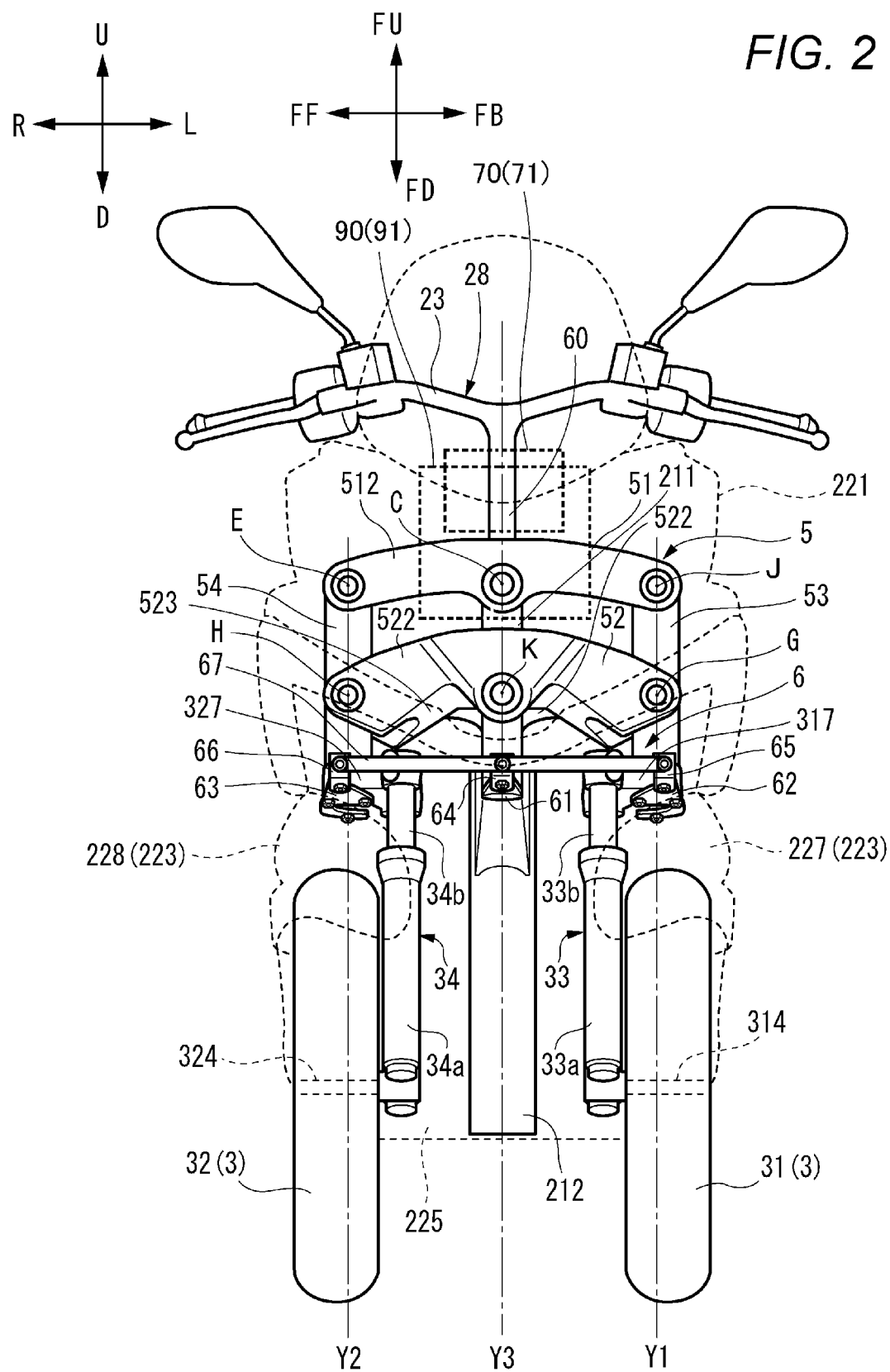
FIG. 2 is a front view of a front portion of the vehicle shown in FIG. 1.
Figure 3:
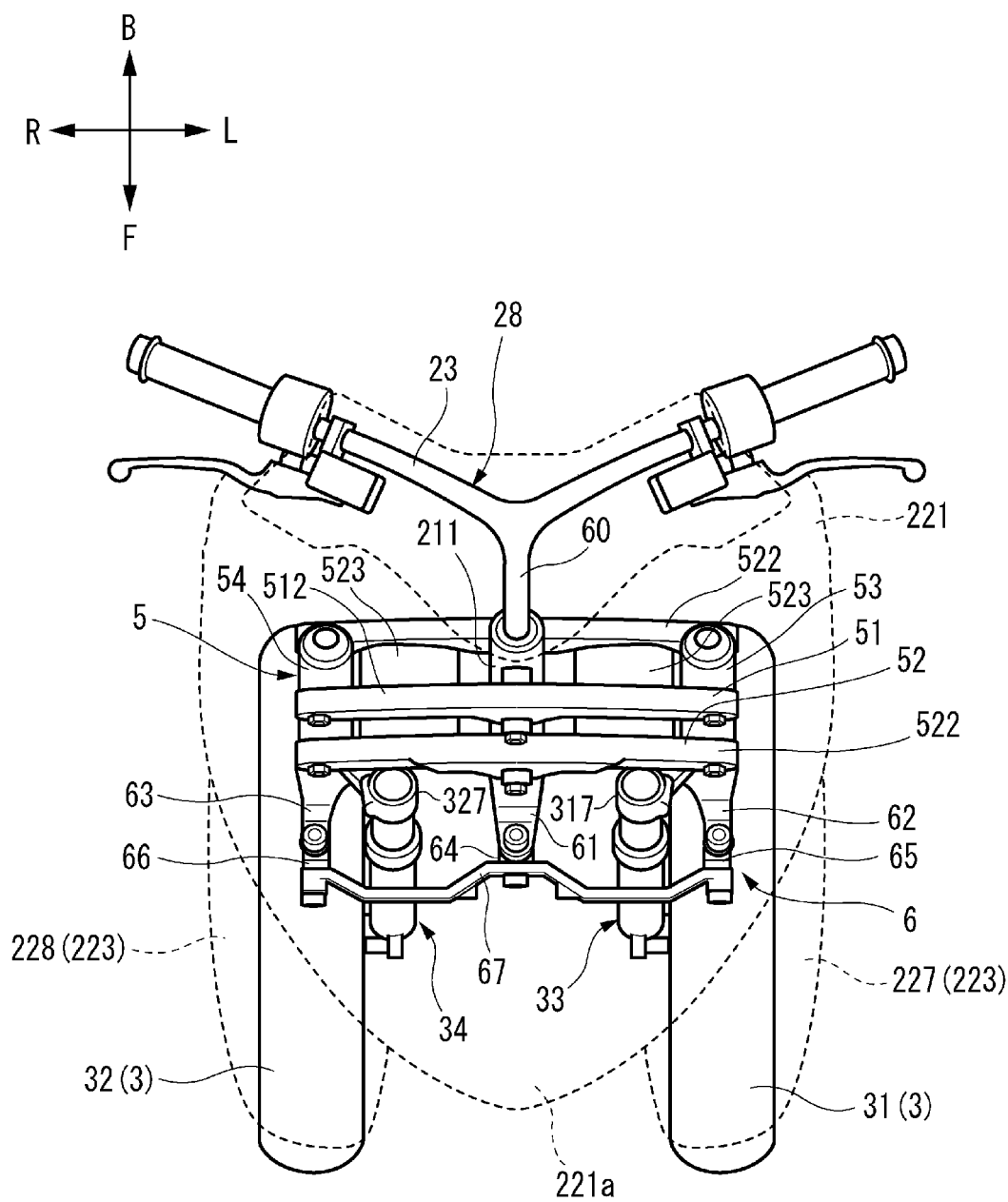
FIG. 3 is a plan view of the front portion of the vehicle shown in FIG. 1.

FIG. 2 is a front view of the front portion of the vehicle 1 shown in FIG. 1 when the vehicle 1 is viewed from the front thereof. FIG. 3 is a plan view of the front portion of the vehicle 1 shown in FIG. 1 when the vehicle 1 is viewed from thereabove. FIGS. 2 and 3 show the front portion of the vehicle 1 as seen through the body cover 22. As shown in FIGS. 2 and 3, the vehicle 1 has a steering effort transmission mechanism 6, the link mechanism 5, a left shock absorbing device 33, a right shock absorbing device 34 and the pair of left and right front wheels 3. The left shock absorbing device 33 supports a left front wheel 31 on the vehicle body frame 21. The right shock absorbing device 34 supports a right front wheel 32 on the vehicle body frame 21.

The pair of left and right front wheels 3 includes the left front wheel 31 and the right front wheel 32. The left front wheel 31 and the right front wheel 32 are disposed to be aligned side by side in a left-and-right direction of the vehicle body frame 21. The left front wheel 31 and the right front wheel 32 are disposed to be laterally symmetrical with each other with respect to a center of the vehicle in relation to a vehicle's width direction. In addition, of the pair of left and right front fenders 223, a first front fender 227 is disposed directly above the left front wheel 31. Of the pair of left and right front fenders 223, a second front fender 228 is disposed directly above the right wheel 32. The left front wheel 31 is supported by the left shock absorbing device 33. The right front wheel 32 is supported by the right shock absorbing device 34. As shown in FIG. 1, the left front wheel 31 includes a left tire 31*a* and a left wheel 31*b* that supports the left tire 31*a* and rotates together with a left brake disc 711. The right front wheel 32 includes a right tire 32*a* and a right wheel 32*b* that supports the right tire 32*a* and rotates together with a right brake disc 721.

The left shock absorbing device 33 is a so-called telescopic shock absorbing device and dampens vibrations from a road surface. The left shock absorbing device 33 supports the left front wheel 31 at a lower portion thereof and absorbs an upward displacement of the left front wheel 31 in an up-and-down direction of the vehicle body frame 21. The left shock absorbing device 33 has a first lower portion 33*a* and a first upper portion 33*b*. The left front wheel 31 is supported on the first lower portion 33*a*. The first lower portion 33*a* extends in the up-and-down direction, and a left wheel axle member 314 is supported on a lower end side of the first lower portion 33*a*. The left wheel axle member 314 supports the left front wheel 31. The first upper portion 33*b* is disposed at an upper side of the first lower portion 33*a* in such a state that the first upper portion 33*b* is partially inserted into the first lower portion 33*a*. The first upper portion 33*b* can move relative to the first lower portion 33*a* in a direction in which the first lower portion 33*a* extends. An upper portion of the first upper portion 33*b* is fixed to a first bracket 317.

The first lower portion 33*a* and the first upper portion 33*b* make up two telescopic elements that are connected together while being aligned parallel in a front-and-rear direction. This configuration restricts the first upper portion 33*b* from turning relative to the first lower portion 33*a*.

The right shock absorbing device 34 is a so-called telescopic shock absorbing device and dampens vibrations from a road surface. The right shock absorbing device 34 supports the right front wheel 32 at a lower portion thereof and absorbs an upward displacement of the right front wheel 32 in the up-and-down direction of the vehicle body frame 21. The right shock absorbing device 34 has a second lower portion 34*a* and a second upper portion 34*b*. The right front wheel 32 is supported on the second lower portion 34*a*. The second lower portion 34*a* extends in the up-and-down direction, and a right wheel axle member 324 is supported on a lower end side of the second lower portion 34*a*. The right wheel axle member 324 supports the right front wheel 32. The second upper portion 34*b* is disposed at an upper side of the second lower portion 34*a* in such a state that the second upper portion 34*b* is partially inserted into the second lower portion 34*a*. The second upper portion 34*b* can move relative to the second lower portion 34*a* in a direction in which the second lower portion 34*a* extends. An upper portion of the second upper portion 34*b* is fixed to a second bracket 327.

The second lower portion 34*a* and the second upper portion 34*b* make up two telescopic elements that are connected together while being aligned parallel in the front-and-rear direction. This configuration restricts the second upper portion 34*b* from turning relative to the second lower portion 34*a*.

The steering effort transmission mechanism 6 is disposed above the left front wheel 31 and the right front wheel 32. The steering force transmission mechanism 6 includes a steering member 28 as a member for inputting a steering effort applied by a rider. The steering member 28 has the steering shaft 60 and a handlebar 23 that is connected to an upper portion of the steering shaft 60. The steering shaft 60 is disposed so that the steering shaft 60 is partially inserted into the headpipe 211 and extends substantially in the up-and-down direction. The steering shaft 60 can turn relative to the headpipe 211. The steering shaft 60 turns in association with an operation of the handlebar 23 by the rider.

The steering effort transmission mechanism 6 has, in addition to the steering member 28, a first transmission plate 61, a second transmission plate 62, a third transmission plate 63, a first joint 64, a second joint 65, a third joint 66, a tie rod 67, the first bracket 317 and the second bracket 327. The steering effort transmission mechanism 6 transmits a steering effort applied by the rider to operate the handlebar 23 to the first bracket 317 and the second bracket 327 by way of those constituent members.

The first transmission plate 61 is disposed at the center in the vehicle's width direction and is connected to the steering shaft 60 so as not to turn relative to the steering shaft 60. The first transmission plate 61 turns as the steering shaft 60 turns.

The second transmission plate 62 is connected to a left side member 53 of the link mechanism 5, which will be described later, so as to turn relatively. The second transmission plate 62 is fixed to the first bracket 317. The second transmission plate 62 is disposed below the first bracket 317. The second transmission plate 62 is disposed on the left of the first transmission plate 61.

The third transmission plate 63 is connected to a right side member 54 of the link mechanism 5, which will be described later, so as to turn relatively. The third transmission plate 63 is disposed to be laterally symmetrical with the second transmission plate 62 with respect to the first transmission plate 61. The third transmission plate 63 is fixed to the second bracket 327. The third transfer plate 63 is positioned below the second bracket 327.

The first joint 64 is disposed at a front portion of the first transmission plate 61. The first joint 64 is supported by a turning shaft member that extends in the up-and-down direction so as to turn relative to the first transmission plate 61. The second joint 65 is disposed at a front portion of the second transmission plate 62. The second joint 65 is supported by a turning shaft member that extends in the up-and-down direction so as to turn relative to the second transmission plate 62. The third joint 66 is disposed at a front portion of the third transmission plate 63. The third joint 66 is supported by a turning shaft member that extends in the up-and-down direction so as to turn relative to the third transmission plate 63. The first joint 64, the second joint 65, and the third joint 66 each have a shaft portion that extends in a front-and-rear direction at a front portion thereof.

The tie rod 67 is disposed to extend in the vehicle's width direction. The tie rod 67 is supported so as to turn relative to the shaft portions that extend in the front-and-rear direction at the front portions of the first joint 64, the second joint 65 and the third joint 66.

The steering effort transmission mechanism 6 that is configured in the way described above transmits the steering effort transmitted from the steering member 28 to the tie rod 67 by way of the first transmission plate 61 and the first joint 64. This causes the tie rod 67 to be displaced either leftwards or rightwards. The steering effort transmitted to the tie rod 67 is transmitted from the tie rod 67 to the first bracket 317 byway of the second transmission plate 62 and the second joint 65 and is also transmitted from the tie rod 67 to the second bracket 327 by way of the third transmission plate 63 and the third joint 66. This causes the first bracket 317 and the second bracket 327 to turn in the direction in which the tie rod 67 is displaced.

<Link Mechanism>

In this embodiment, the link mechanism 5 adopts a four-joint parallel link system (also called a parallelogram link). The link mechanism 5 is disposed below the handlebar 23. The link mechanism 5 is connected to the headpipe 211 of the vehicle body frame 21. The link mechanism 5 includes an upper cross member 51, a lower cross member 52, the left side member 53 and the right side member 54 that make up a configuration enabling the vehicle 1 to perform a leaning action. Additionally, the link mechanism 5 includes the first bracket 317 and the left shock absorbing device 33 that make up a configuration that is connected to a lower portion of the left side member 53 so as to lean together with the left side member 53. Further, the link mechanism 5 includes the second bracket 327 and the right shock absorbing device 34 that make up a configuration that is connected to a lower portion of the right side member 54 so as to lean together with the right side member 54.

The right side member 54 supports an upper portion of the right shock absorbing device 34 so as to turn about a right steering axis Y2 that extends in the up-and-down direction of the vehicle body frame 21. The left side member 53 supports an upper portion of the left shock absorbing device 33 so as to turn about a left steering axis Y1 that is parallel to the right steering axis Y2. The upper cross member 51 is connected to an upper portion of the right side member 54 at a right end portion thereof so as to turn about an upper right axis E that extends in the front-and-rear direction of the vehicle body frame 21, is connected to an upper portion of the left side member 53 at a left end portion thereof so as to turn about an upper left axis J that is parallel to the upper right axis E, and is connected to the vehicle body frame 21 at a middle portion thereof so as to turn about an upper middle axis (an example of a link axis) C that is parallel to the upper right axis E and the upper left axis J. The lower cross member 52 is connected to a lower portion of the right side member 54 at a right end portion thereof so as to turn about a lower right axis H that is parallel to the upper right axis E, is connected to a lower portion of the left side member 53 at a left end portion thereof so as to turn about a lower left axis G that is parallel to the upper left axis J, and is connected to the vehicle body frame 21 at a middle portion thereof so as to turn about a lower middle axis K that is parallel to the upper middle axis C.

The upper cross member 51 includes a plate-shaped member 512 that is disposed ahead of the headpipe 211 and which extends in the vehicle's width direction. The plate-shaped member 512 is connected to the headpipe 211 by a support portion and can turn about the upper middle axis C that extends substantially in the front-and-rear direction relative to the headpipe 211. A left end of the upper cross member 51 is connected to the left side member 53 by a connecting portion. The upper cross member 51 can turn relative to the left side member 53 about the upper left axis J that extends substantially in the front-and-rear direction. A right end of the upper cross member 51 is connected to the right side member 54 by a connecting portion. The upper cross member 51 can turn relative to the right side member 54 about the upper right axis E that extends substantially in the front-and-rear direction.

The lower cross member 52 is connected to the headpipe 211 by the support portion and can turn about the lower middle axis K that extends substantially in the front-and-rear direction. The lower cross member 52 is disposed below the upper cross member 51. The lower cross member 52 has substantially the same transverse length as that of the upper cross member 51 in relation to the vehicle's width direction and is disposed parallel to the upper cross member 51.

The lower cross member 52 includes a pair of plate-shaped members 522, 522 that extend in the vehicle's width direction. The pair of plate-shaped members 522, 522 are disposed so as to hold the headpipe 211 therebetween in the front-and-rear direction. The pair of plate-shaped members 522, 522 are connected integrally to each other by a middle portion 523. The middle portion 523 may be integral with or separate from the pair of plate-shaped members 522, 522. A left end of the lower cross member 52 is connected to the left side member 53 by a connecting portion. The lower cross member 52 can turn relative to the left side member 53 about the lower left axis G that extends substantially in the front-and-rear direction. A right end of the lower cross member 52 is connected to the right side member 54 by a connecting portion. The lower cross member 52 can turn relative to the right side member 54 about the lower right axis H that extends substantially in the front-and-rear direction.

The left side member 53 is disposed on the left of the headpipe 211 and extends parallel to a direction in which the headpipe 211 extends. The left side member 53 is disposed above the left front wheel 31 and above the left shock absorbing device 33. The left side member 53 is connected to the first bracket 317 at the lower portion thereof and is attached to the first bracket 317 so as to turn about the left steering axis Y1.

The right side member 54 is disposed on the right of the headpipe 211 and extends parallel to the direction in which the headpipe 211 extends. The right side member 54 is disposed above the right front wheel 32 and above the right shock absorbing device 34. The right side member 54 is connected to the second bracket 327 at the lower portion thereof and is attached to the second bracket 327 so as to turn about the right steering axis Y2.

In this way, the upper cross member 51, the lower cross member 52, the left side member 53 and the right side member 54 are connected so that the upper cross member 51 and the lower cross member 52 keep parallel postures to each other and that the left side member 53 and the right side member 54 keep parallel postures to each other.

<Steering Operation>

Figure 4:
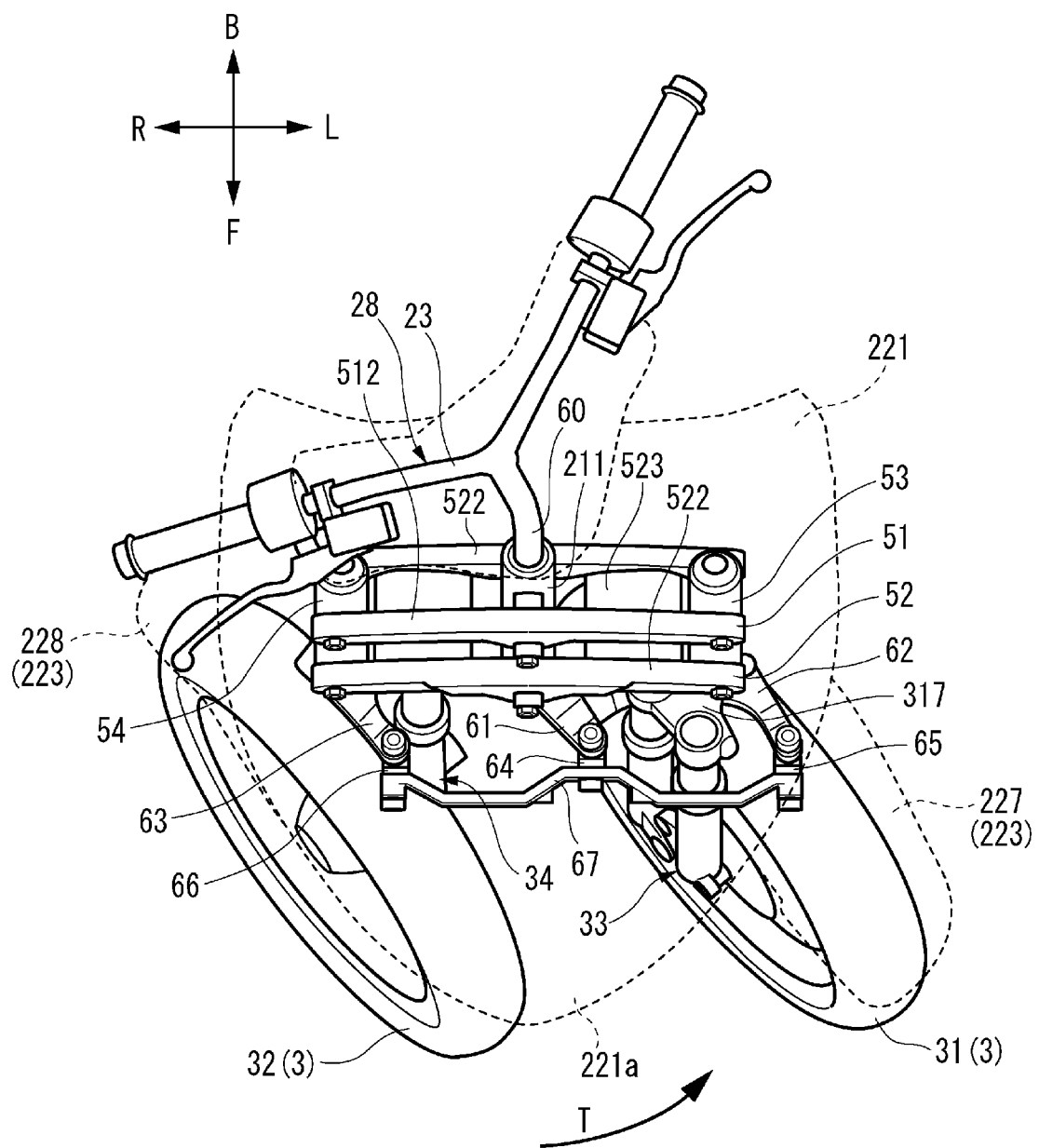
FIG. 4 is a plan view of the front portion of the vehicle in a state where the vehicle shown in FIG. 1 is steered.

FIG. 4 is a plan view of the front portion of the vehicle 1 when the vehicle 1 is steered to turn, depicting a steering operation of the vehicle 1. As shown in FIG. 4, when the handlebar 23 is turned in the left-and-right direction, the steering effort transmission mechanism 6 is activated to perform a steering operation. When the steering shaft 60 turns as a result of the handlebar 23 being turned, the first transmission plate 61 turns in association with the turning of the steering shaft 60. For example, when the steering shaft 60 turns in a direction indicated by an arrow T in FIG. 4, the tie rod 67 moves leftwards and rearwards in association with the turning of the first transmission plate 61. As this occurs, the first transmission plate 61 is allowed to turn relative to the first joint 64 by a turning shaft member of the first joint 64 that extends substantially in the up-and-down direction, and the tie rod 67 moves leftwards and rearwards while maintaining its posture. The second transmission plate 62 and the third transmission plate 63 turn in the direction indicated by the arrow T about the left side member 53 and the right side member 54, respectively, as the tie rod 67 moves leftwards and rearwards. As this occurs, the second transmission plate 62 turns relative to the second joint 65 about a rotating shaft member of the second joint 65 that extends in the up-and-down direction, and the third transmission plate 63 turns relative to the third joint 66 about a rotating shaft member of the third joint 66 that extends in the up-and-down direction.

When the second transmission plate 62 and the third transmission plate 63 turn in the direction indicated by the arrow T, the first bracket 317 and the second bracket 327 turn in the direction indicated by the arrow T. When the first bracket 317 and the second bracket 327 turn in the direction indicated by the arrow T, the left front wheel 31 turns about the left steering axis Y1 (refer to FIG. 2) via the left shock absorbing device 33, and the right front wheel 32 turns about the right steering axis Y2 (refer to FIG. 2) via the right shock absorbing device 34.

<Leaning Operation>

Figure 5:
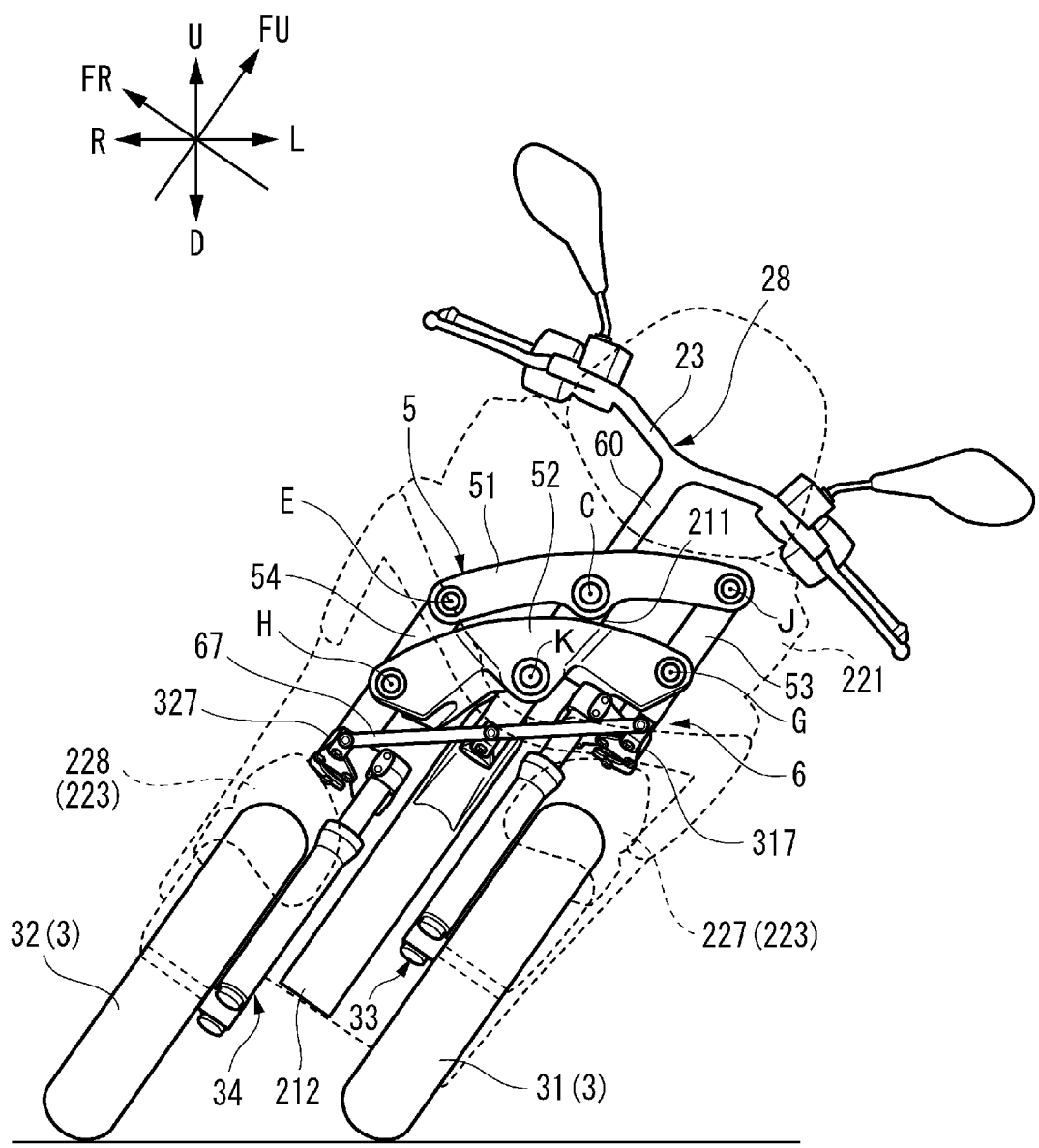
FIG. 5 is a front view of the front portion of the vehicle in a state where the vehicle shown in FIG. 1 is caused to lean.

FIG. 5 is a front view of the front portion of the vehicle 1 when the vehicle 1 is caused to lean, depicting a leaning operation of the vehicle 1. As shown in FIG. 5, the vehicle 1 leans in the left-and-right direction as the link mechanism 5 operates. The operation of the link mechanism 5 means that the members of the link mechanism 5 that are designed to execute a leaning operation (the upper cross member 51, the lower cross member 52, the left side member 53 and the right side member 54) turn relatively about their connecting points as turning axes thereof so as to change the shape of the link mechanism 5. In the link mechanism 5 of this embodiment, when the vehicle stands upright, the upper cross member 51, the lower cross member 52, the left side member 53 and the right side member 54 are disposed substantially into a rectangular shape when viewed from the front. Then, when the vehicle 1 leans, the upper cross member 51, the lower cross member 52, the left side member 53 and the right side member 54 are deformed substantially into a parallelogram shape. The link mechanism 5 executes a leaning operation in association with the relative turning operations of the upper cross member 51, the lower cross member 52, the left side member 53 and the right side member 54 to thereby cause the left front wheel 31 and the right front wheel 32 to lean.

For example, when the rider causes the vehicle 1 to lean to the left, the headpipe 211 leans to the left of the vehicle 1 with respect to a vertical direction. When the headpipe 211 leans, the upper cross member 51 turns relative to the headpipe 211 about the upper middle axis C, and the lower cross member 52 turns relative to the headpipe 211 about the lower middle axis K. Then, the upper cross member 51 moves further leftwards than the lower cross member 52, and the left side member 53 and the right side member 54 lean from the vertical direction while being kept parallel to the headpipe 211. When the left side member 53 and the right side member 54 lean, the left side member 53 and the right side member 54 turn relative to the upper cross member 51 and the lower cross member 52. Consequently, when the vehicle 1 is caused to lean, the left front wheel 31 and the right front wheel 32 that are supported on the left side member 53 and the right side member 54, respectively, lean from the vertical direction while being kept parallel to the headpipe 211 as the left side member 53 and the right side member 54 lean.

In addition, during the leaning operation, the tie rod 67 turns relative to the respective longitudinally extending shaft portions of the first joint 64, the second joint 65 and the third joint 66. This allows the tie rod 67 to maintain its parallel posture to the upper cross member 51 and the lower cross member 52 even though the vehicle 1 leans.

In this way, the link mechanism 5 that causes the left front wheel 31 and the right front wheel 32 to lean by executing the leaning operation is disposed above the left front wheel 31 and the right front wheel 32. Namely, the turning axes of the upper cross member 51, the lower cross member 52, the left side member 53 and the right side member 54 which are the turning members making up the link mechanism 5 are disposed above the left front wheel 31 and the right front wheel 32.

<Steering Operation+Leaning Operation>

Figure 6:
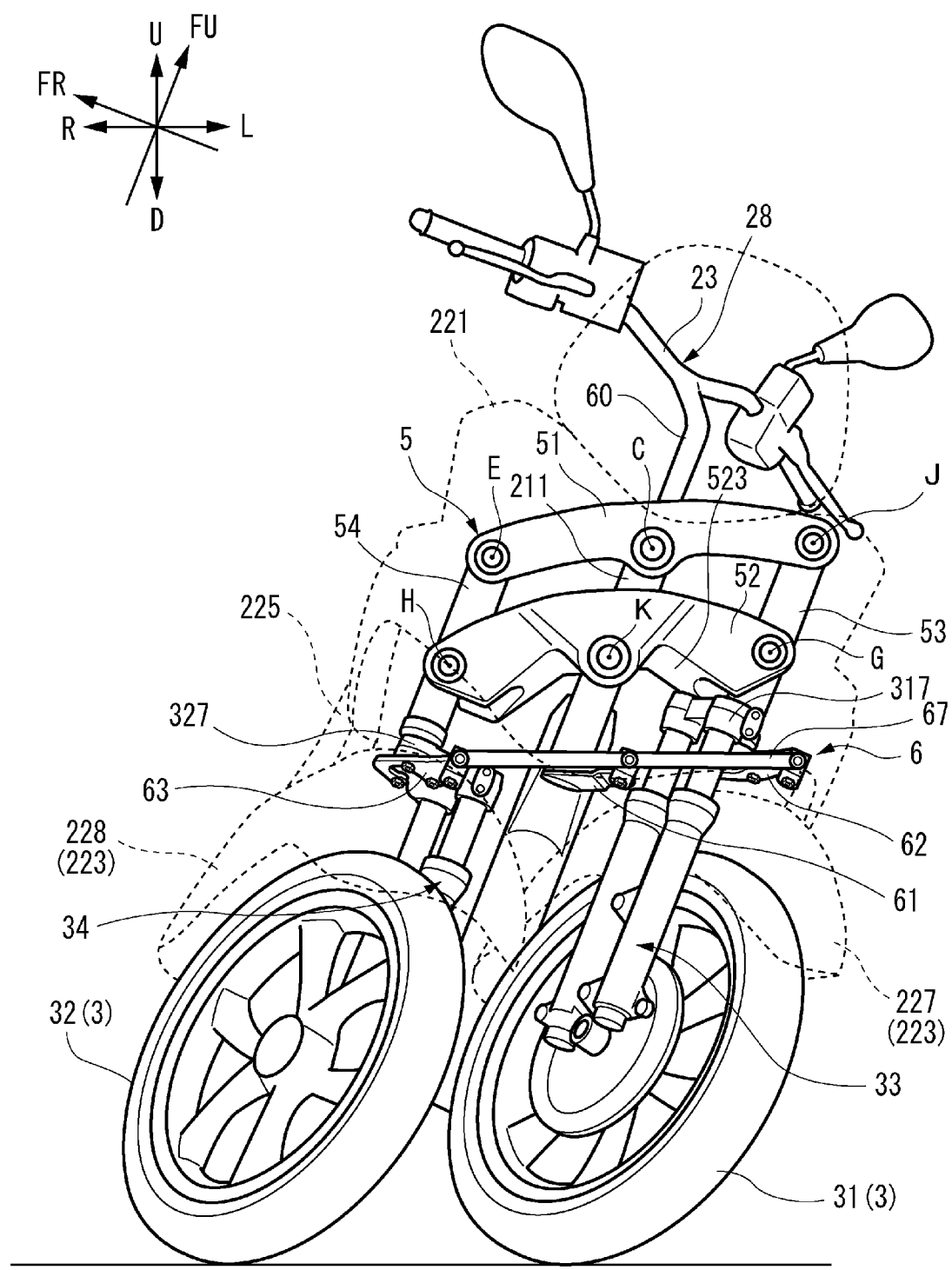
FIG. 6 is a front view of the front portion of the vehicle in a state where the vehicle shown in FIG. 1 is steered and is caused to lean.

FIG. 6 is a front view of the front portion of the vehicle 1 in such a state that the vehicle 1 is steered and caused to lean. In FIG. 6, the vehicle 1 is steered to the left and is caused to lean to the left thereof. When the vehicle 1 is operated as illustrated in FIG. 6, the directions of the left front wheel 31 and the right front wheel 32 are changed by the steering operation, and both the left front wheel 31 and the right front wheel 32 are caused to lean together with the vehicle body frame 21 by the leaning operation. In this state, the upper cross member 51, the lower cross member 52, the left side member 53 and the right side member 54 of the link mechanism 5 are deformed substantially into a parallelogram shape, and the tie rod 67 moves to the left or right to which the vehicle 1 is steered to turn (to the left in FIG. 6) and to the rear.

<Electric Power Steering System: EPS>

As shown in FIGS. 1 and 2, the vehicle 1 according to the embodiment includes an electric power steering system (hereinafter, referred to as an EPS) 70 that can turn the steering shaft 60 using a first actuator 71 such as a motor. The EPS 70 assists a steering effort (an example of a first steering effort) that is inputted into the handlebar 23 (an example of a steering effort input unit) connected to the steering shaft 60 by the rider.

One part of the first actuator 71 of the EPS 70 is connected to the vehicle body frame 21. The other part of the first actuator 71 that is displaced relative to the one part is fixed to the steering shaft 60 or a member that is displaced together with the steering shaft 60. This allows the EPS 70 to apply a force attempting to turn the steering shaft 60 relative to the vehicle body frame 21 or to stop the turning of the steering shaft 60.

Incidentally, in a vehicle having two front wheels like the vehicle described in Patent Literature 1, when compared with a vehicle having one front wheel, the number of contact points with a road surface is increased, which then requires a rider's great steering effort. Therefore, the inventor has reached an idea of installing the electric power steering system (the EPS 70) that can assist the rider with his or her steering effort on the vehicle 1. While the vehicle 1 is running, when the vehicle body frame 21 leans to the right, the vehicle 1 attempts to change to increase a steering angle of the handlebar 23 in a clockwise direction when the vehicle 1 is viewed from the above, whereas when the vehicle body frame 21 leans to the left, the vehicle 1 attempts to change to increase a steering angle of the handlebar 23 in a counterclockwise direction when the vehicle 1 is viewed from the above.

Further, the inventor has noticed that a vertical angle suppression function of the vehicle 1 can be added by the use of the EPS 70. The vertical angle suppression function means a function of suppressing a behavior of the vehicle 1 that increases the vertical angle by applying a steering effort to reduce the vertical angle by the use of the EPS 70 when the vehicle 1 behaves to increase the vertical angle. The vertical angle means an acute angle formed between an imaginary line that extends in the up-and-down direction of the vehicle body frame 21 and a vertical direction when the vehicle 1 is viewed from the front thereof. Specifically speaking, when attempting to suppress a behavior of the vehicle 1 that increases the vertical angle to the right while the vehicle 1 is running, turning the right front wheel 32 and the left front wheel 31 clockwise (steering the right front wheel 32 and the left front wheel 31 to the right) when the vehicle 1 is viewed from the above can allow a force to reduce the vertical angle to act on the vehicle 1. When attempting to suppress a behavior of the vehicle 1 that increases the vertical angle to the left while the vehicle 1 is running, turning the right front wheel 32 and the left front wheel 31 counterclockwise (steering the right front wheel 32 and the left front wheel 31 to the left) when the vehicle 1 is viewed from the above can allow a force to reduce the vertical angle to act on the vehicle 1.

However, when attempting to realize the vertical angle suppression function by the use of the EPS 70, an operation of the EPS 70 that is performed to suppress the vertical angle acts so that the rider feels it as a disturbance to the handlebar 23, often causing the rider to feel a sensation of physical disorder. For example, there is a case where the EPS 70 attempts to operate while the rider does not operate the handlebar. Alternatively, there is a case where the EPS 70 attempts to move the handlebar 23 more than an intended operation of the handlebar 23 by the rider when the rider is operating the handlebar 23. Further, there is a case where the EPS 70 attempts to resist an intended operation of the handlebar 23 by the rider while the rider attempts to operate the handlebar 23.

Therefore, this embodiment provides the vehicle 1 that has installed thereon the EPS 70 that makes it difficult for the rider to feel a sensation of physical disorder while realizing the vertical angle suppression function.

The inventor has studied the situation where the rider feels a sensation of physical disorder and has noticed that the situation tends to occur in a low speed range. The inventor has found out the fact that the vehicle speed and a limit angle at which the vehicle 1 can maintain the vertical angle are in a relationship shown in FIG. 7.

Figure 7:
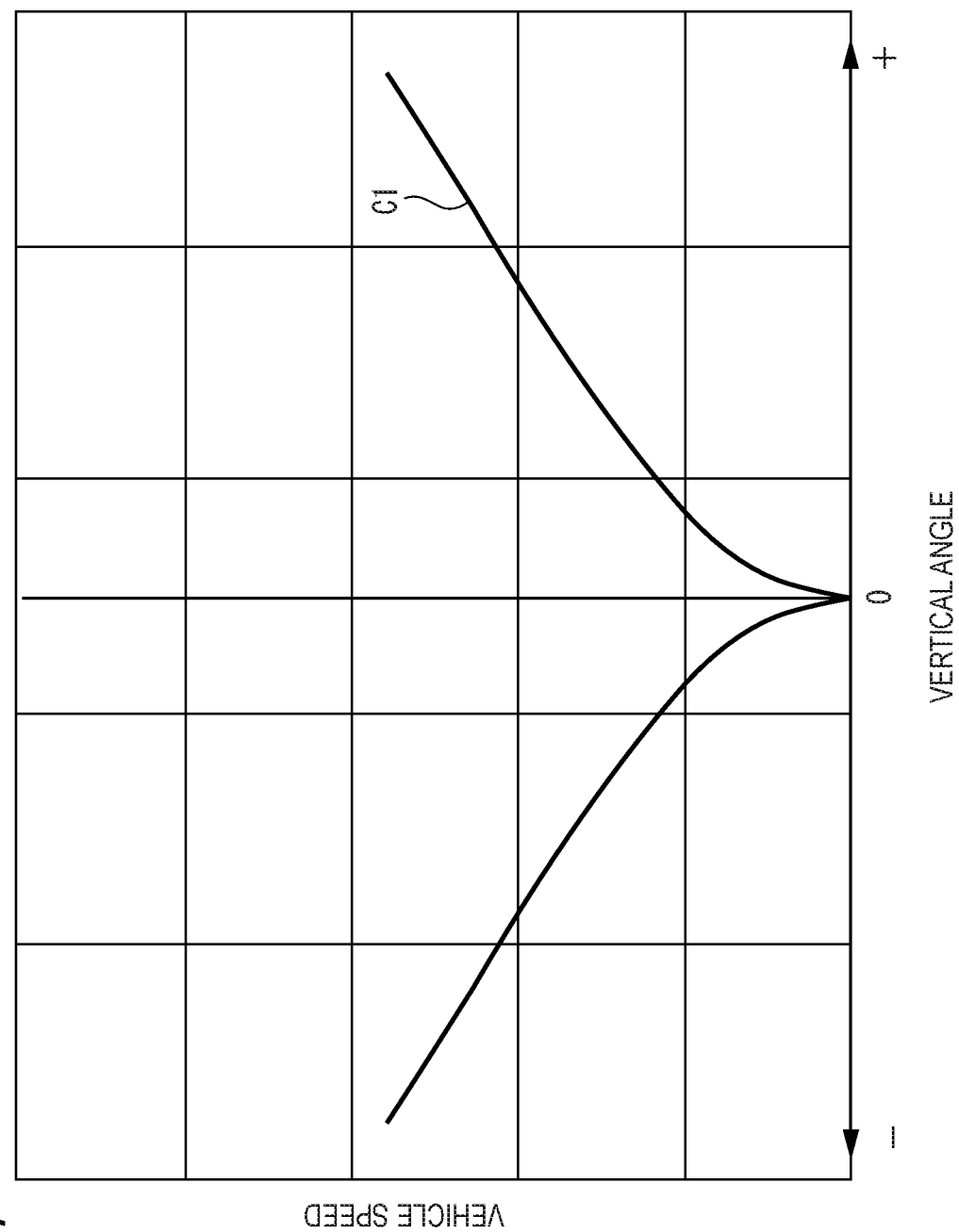
FIG. 7 is a graph showing a relationship between vertical angle, and vehicle speed and limit angle.

FIG. 7 is a graph showing a relationship between the vehicle speed and the limit angle. FIG. 7 shows that for example, when the vehicle 1 is turning with a specific turning radius, the vehicle 1 can easily maintain its vertical angle in a range above a curve c1 (a range where the vehicle speed is faster than the curve c1 or the vertical angle is smaller than the curve c1) and cannot maintain its vertical angle in a range below the curve c1 (a range where the vehicle speed is slower than the curve c1 or the vertical angle is greater than the curve c1). As shown in FIG. 7, the limit angle is determined according to the vehicle speed. The limit angle becomes smaller as the vehicle speed decreases. Namely, in a situation where the vehicle speed is low, the frequency at which the rider feels a sensation of physical disorder is increased since the vertical angle suppression function is desired to be put into operation frequently.

To suppress a behavior that increases the vertical angle, it is effective to steer the vehicle 1 (turn the handlebar 23) more in the direction in which the vehicle is leaning. For example, in a case where the vehicle 1 behaves to increase the vertical angle to the right, it is effective to steer the vehicle more to the right, whereas in a case where the vehicle 1 behaves to increase the vertical angle to the left, it is effective to steer the vehicle more to the left. As this occurs, the degree to which the vertical angle changes in relation to an operation of the handlebar 23 becomes lower in a low speed range than in a high speed range. Thus, even though the rider attempts to change the vertical angle by the same degree both in the low and high speed ranges, the handlebar is operated more in quantity in the low speed range than in the high speed range. The inventor has found out the fact that in the vehicle 1 having the EPS 70 installed thereon, the rider tends to feel a sensation of physical disorder in the low speed range where the handlebar 23 needs to be operated more in quantity because the rider tends to feel easily a sensation of physical disorder when the assisting torque by the EPS 70 becomes great as described above.

The vehicle 1 with the two front wheels according to this embodiment has installed thereon the link mechanism 5 configured to cause the vehicle 1 to lean. The link mechanism 5 includes the upper cross member 51. The upper cross member 51 is supported so as to turn about the link axis that extends in the front-and-rear direction of the vehicle body frame 21 and changes the relative position between the right front wheel 32 and the left front wheel 31 in the up-and-down direction of the vehicle body frame 21 according to the degree to which the vehicle body frame 21 leans. The inventor has noticed that a turning effort can be exerted on the upper cross member 51 to suppress the behavior that increases the vertical angle. Then, as will be described below, the inventor has come to an idea of installing on the vehicle 1 an electric power leaning system (hereinafter, referred to as EPL) 90 configured to apply a turning effort to the upper cross member 51 so as to suppress the behavior that increases the vertical angle.

<Electric Power Leaning System: EPL>

The vehicle 1 according to this embodiment includes, as shown in FIGS. 1 and 2, the EPL 90 that operates the link mechanism 5 by a second actuator 91 such as a motor. One part of the second actuator 91 of the EPL 90 is fixed to the vehicle body frame 21. The other part of the second actuator 91 that is displaced relative to the one part thereof is fixed to the upper cross member 51. This allows the EPL 90 to apply a force attempting to turn the upper cross member 51 relative to the vehicle body frame 21 or to stop the turning of the upper cross member 51.

Figure 8:
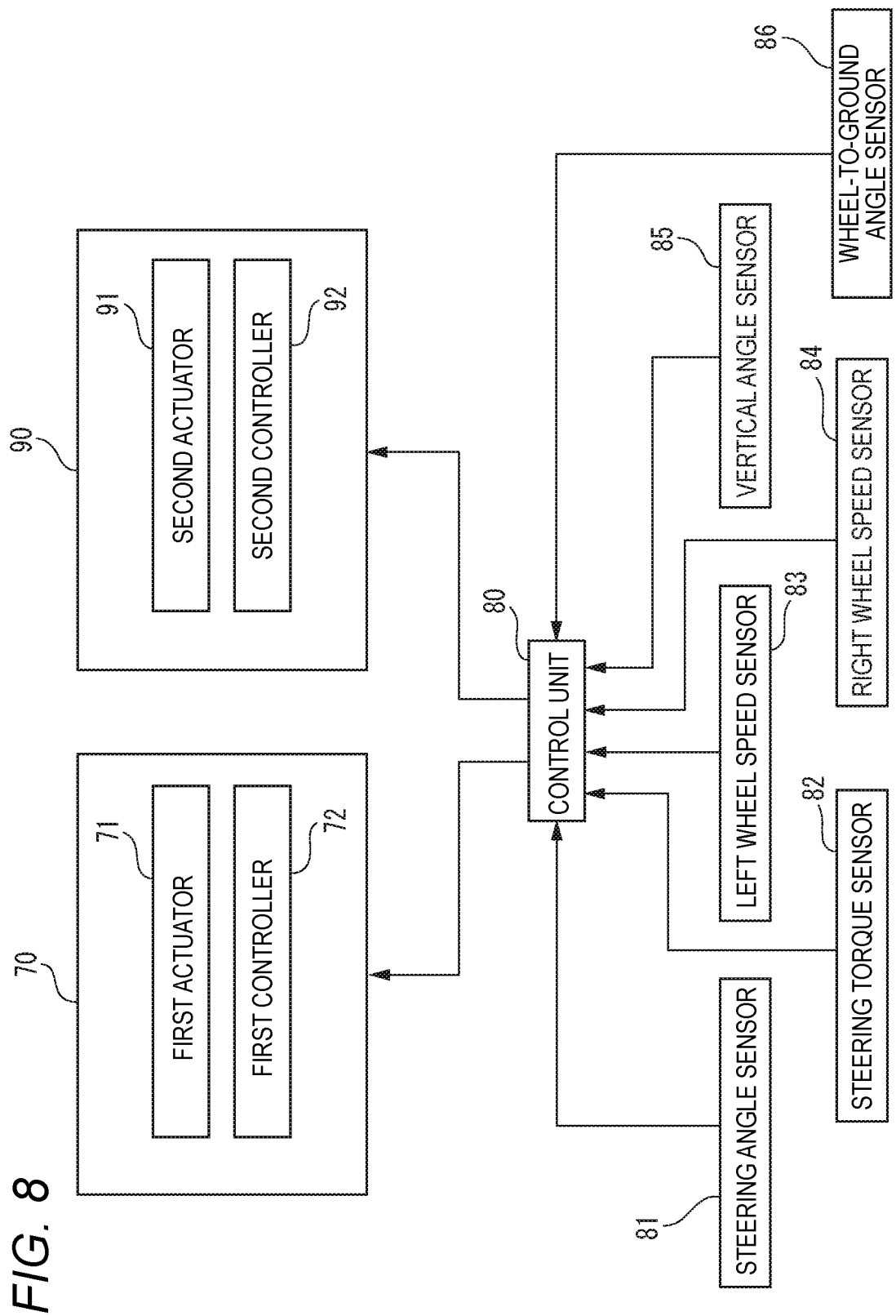
FIG. 8 is a control block diagram of an EPS and an EPL.

FIG. 8 is a block diagram depicting a configuration for driving the EPS 70 and the EPL 90. As shown in FIG. 8, the vehicle 1 includes a steering angle sensor 81, a steering torque sensor 82, a left wheel speed sensor 83, a right wheel speed sensor 84, a vertical angle sensor 85, a wheel-to-ground sensor 86 and a control unit 80. The sensors 81 to 86 are each connected electrically to the control unit 80.

The steering angle sensor 81 transmits an electric signal corresponding to a steering angle that is a turning angle of the handlebar 23 to the control unit 80. The control unit 80 calculates a steering angle from the output of the steering angle sensor 81. The control unit 80 time differentiates the output of the steering angle sensor 81, whereby the control unit 80 can calculate a steering angle speed. The control unit time differentiates further the steering angle speed to calculate a steering angle acceleration. The steering torque sensor 82 transmits an electric signal corresponding to a steering effort inputted into the handlebar 23 to the control unit 80. The control unit 80 time differentiates the output of the steering torque sensor 82, whereby the control unit 80 can calculate a differential value of the steering torque.

The left wheel speed sensor 83 transmits an electric signal corresponding to a rotation speed of the left front wheel 31 to the control unit 80. The right wheel speed sensor 84 transmits an electric signal corresponding to a rotation speed of the right front wheel 32 to the control unit 80. The control unit 80 calculates a vehicle speed from the outputs of the left wheel speed sensor 83 and the right wheel speed sensor 84.

The vertical angle sensor 85 transmits an electric signal corresponding to a leaning angle of the vehicle 1 relative to the vertical angle in the left-and-right direction to the control unit 80. For example, the vertical angle sensor 85 outputs an electric signal corresponding to a leaning angle of the headpipe 211 relative to the direction of gravity in the left-and-right direction. For example, a known gyro sensor can be used for the vertical angle sensor 85. The control unit 80 calculates a vertical angle from the output of the vertical angle sensor 85. The control unit 80 time differentiates the output of the vertical angle sensor 85 to thereby calculate a vertical angle speed. Alternatively, a vertical angle speed may be detected by the use of a vertical angle speed sensor. The control unit 80 time differentiates the vertical angle speed to thereby calculate a vertical angle acceleration.

The wheel-to-ground angle sensor 86 transmits an electric signal corresponding a leaning angle of the vehicle 1 relative to a vertical angle of a road surface in the left-and-right direction to the control unit 80. For example, since the upper cross member 51 is kept parallel in posture to the road surface at all times as described above, the wheel-to-ground angle sensor 86 can output an electric signal corresponding to a leaning angle of the vehicle 1 relative to the vertical direction of the road surface in the left-and-right direction by detecting a turning angle of the upper cross member 51 relative to the headpipe 211. The control unit 80 calculates a wheel-to-ground angle from the output of the wheel-to-ground angle sensor 86.

The control unit 80 transmits an EPS command value "a" to the EPS 70. The control unit 80 transmits an EPL command value "b" to the EPL 90. The EPS 70 includes a first controller 72 and a first actuator 71. The first controller 72 supplies an electric current to the first actuator 71 to obtain output torque corresponding to the EPS command value "a". The EPL 90 includes a second controller 92 and a second actuator 91. The second controller 92 supplies an electric current to the second actuator 91 to obtain output torque corresponding to the EPL command value "b". In this embodiment, the control unit 80 determines the EPS value "a" and the EPL value "b" as follows.

Figure 9:
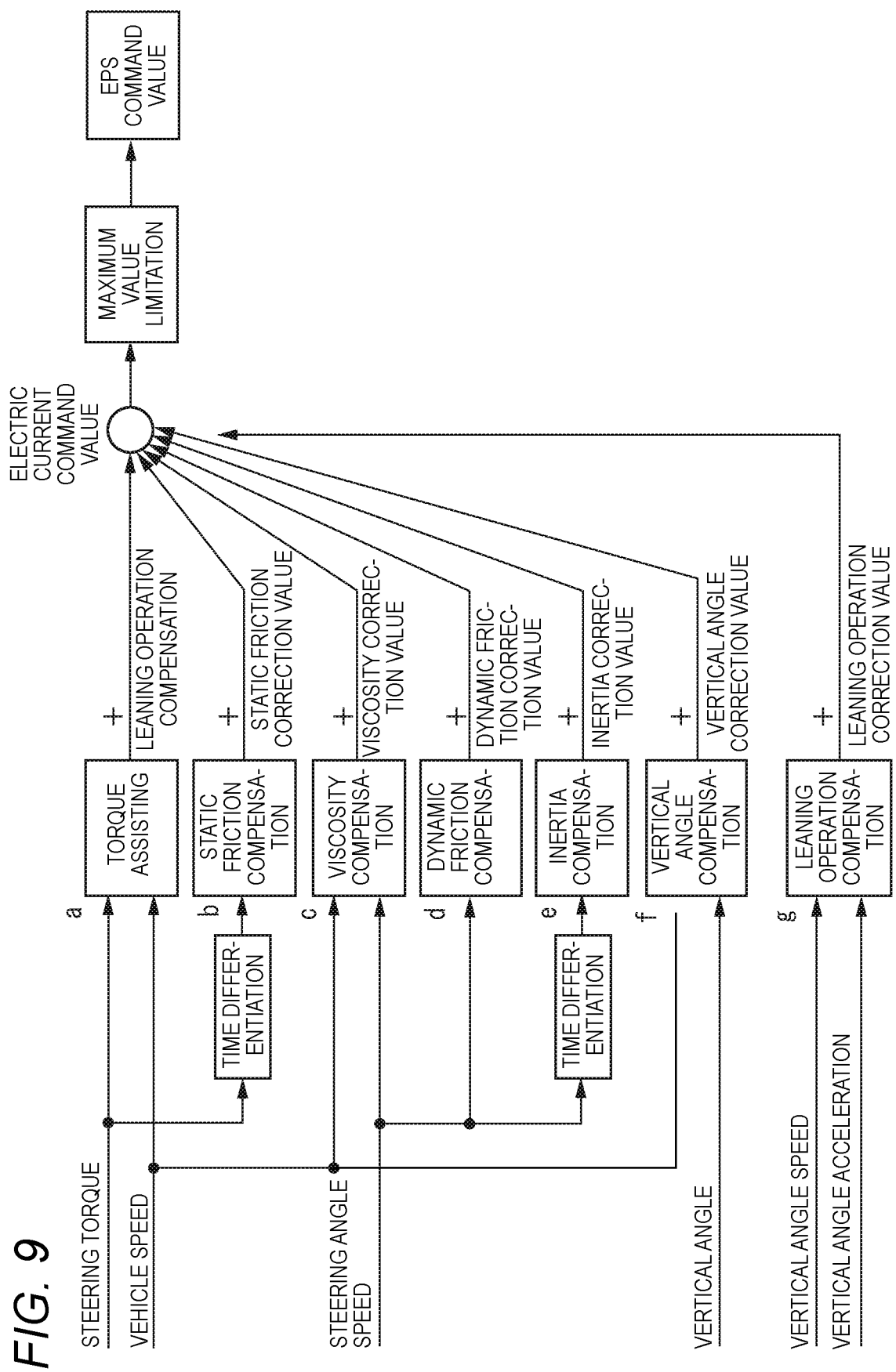
FIG. 9 is a schematic diagram showing an example of a control of the EPS.

The control unit 80 determines the EPS command value "a" according to steering angle, steering torque, vehicle speed, vertical angle, wheel-to-ground angle, vertical angle angular velocity and the like. FIG. 9 is a schematic diagram showing an example of a control of the EPS 70. As shown in FIG. 9, the control unit 80 determines the EPS value based on (a) to (g) below.

(a) The control unit 80 determines a base assisting command value according to, for example, steering torque and vehicle speed. When steering torque inputted into the handlebar 23 by the rider is great, the rider has an intention to increase the steering angle. A gyro effect produced by the front wheels 3 (the left front wheel 31, the right front wheel 32) becomes greater as the vehicle speed becomes faster, and this requires a greater effort to turn the handlebar 23. Therefore, the control unit 80 determines a base assisting command value in such a way that the base assisting command value becomes greater as the steering torque becomes greater and the vehicle speed becomes faster.

(b) The control unit 80 determines a static friction correction value according to, for example, a time differential value of the steering torque. When the control unit 80 determines a static friction correction value, for example, so that the static friction correction value becomes greater as the time differential value of the steering torque becomes greater, a static frictional force can be compensated for. When referred to herein, the static frictional force means a static frictional force that is generated between mechanical elements on a force transmission path defined from the handlebar 23 to the left front wheel 31 and the right front wheel 32 along which a steering effort inputted by the rider is transmitted.

(c) The control unit 80 determines a viscosity correction value according to, for example, vehicle speed and steering angle speed. When the control unit 80 determines a viscosity correction value, for example, so that the viscosity correction value becomes greater as the vehicle speed and the steering angle speed become faster and greater, respectively, a viscous resisting force can be added against the operation of the handlebar 23 by the rider. When referred to herein, the viscous resisting force means a resisting force that the first actuator 71 generates in a pseudo fashion against the operation of the handlebar 23 by the rider. In FIG. 9, as in (a) and (b) that are described above and (d) to (g) that will be described below, the viscosity correction value is described as being added to the electric current command value. However, the viscosity compensation has a negative coefficient, and the viscous resisting force acts as a damping force for the operation of the handlebar 23 by the rider.

(d) The control unit 80 determines a dynamic friction correction value according to, for example, steering angle speed. When the control unit 80 determines a dynamic friction correction value, for example, so that the dynamic friction correction value becomes greater as the steering angle speed becomes faster, a dynamic frictional force can be compensated for. When referred to herein, the dynamic frictional force means a dynamic frictional force that is generated between the mechanical elements on the force transmission path defined from the handlebar 23 to the left front wheel 31 and the right front wheel 32 along which a steering effort inputted by the rider is transmitted.

(e) The control unit 80 determines an inertia correction value according to, for example, a steering angle acceleration that is obtained by time differentiating the steering angle speed. When the control unit 80 determines an inertia correction value, for example, so that the inertia correction value becomes greater as the steering angle acceleration becomes faster, an inertia of the first actuator can be compensated for. It is possible to produce a steering feeling that is the same as a steering feeling that the rider obtains when he or she steers the vehicle 1 on which the first actuator 71 is not installed by compensating for the inertia of the first actuator 71.

(f) The control unit 80 can determine a vertical angle correction value according to, for example, vehicle speed and vertical angle. It becomes difficult to make the vertical angle of the vehicle 1 smaller as the vertical angle becomes greater. Due to this, a vertical angle correction value is determined so that the vertical angle correction value becomes greater as the vertical angle becomes greater.

(g) The control unit 80 can determine a leaning operation correction value according to, for example, vertical angle speed and vertical angle acceleration. For example, to reduce a resisting component of the upper cross member 51 to the headpipe 211 that realizes a leaning operation, the control unit 80 may determine a leaning operation correction value according to vertical angle speed and vertical angle acceleration.

The control unit 80 calculates a final EPS command value "a" by summing the values determined under (a) to (g) above. As this occurs, in a case where an upper limit value is set for the value of an electric current that can be inputted into the first actuator 71, the control unit 80 determines the EPS command value "a" so that an electric current of a smaller value than a maximum electric current value that is inputted into the first actuator 71 is outputted.

Figure 10:
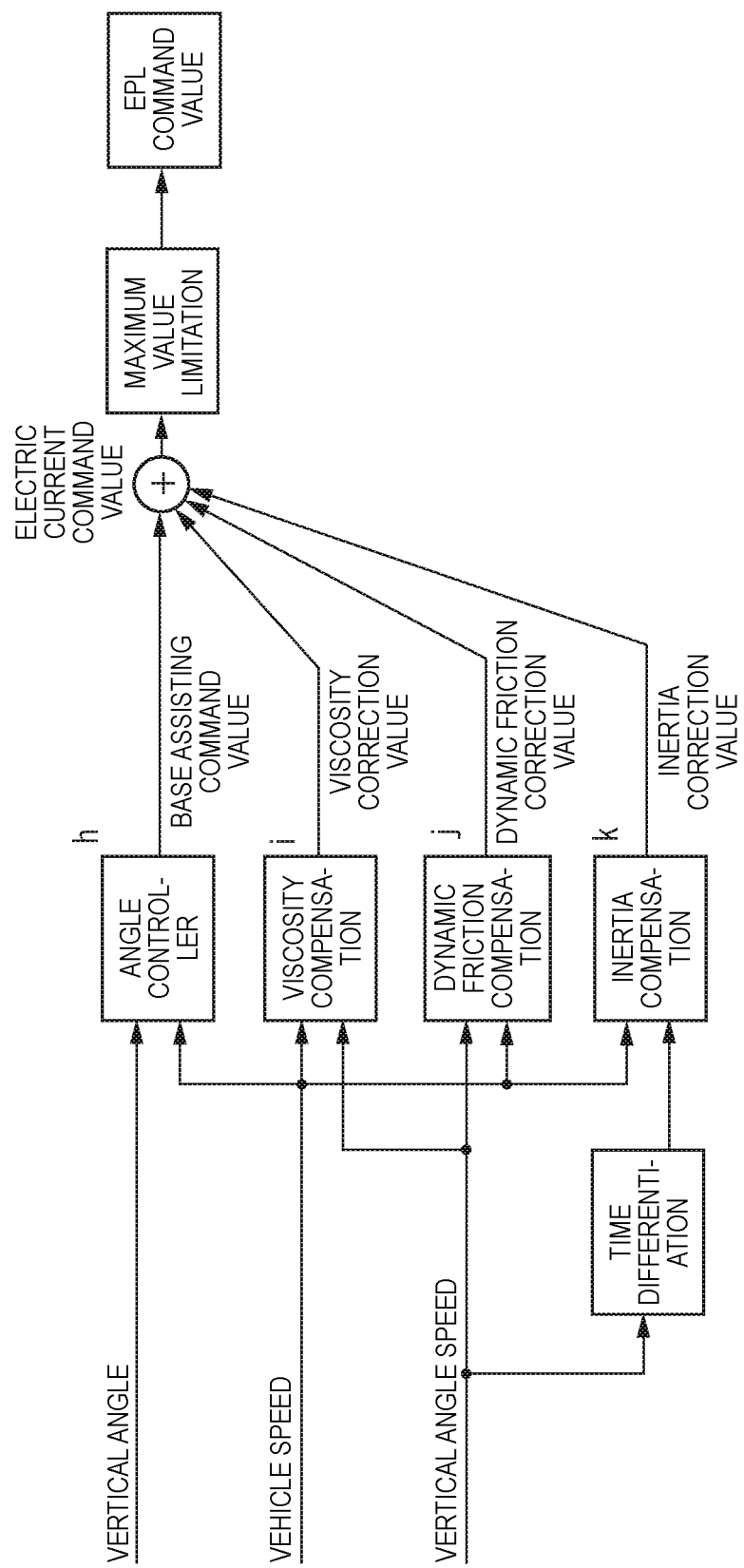
FIG. 10 is a schematic diagram showing an example of a control of the EPL.

The control unit 80 determines the EPL value "b" according to vehicle speed, vertical angle, wheel-to-ground angle and the like. FIG. 10 is a schematic diagram showing an example of a control of the EPL 90. As shown in FIG. 10, the control unit 80 determines the EPL value based on (h) to (k) below.

(h) The control unit 80 determines a base assisting command value according to, for example, vertical angle and vehicle speed. The effort inputted into the upper cross member 51 to reduce the leaning angle of the vehicle 1 becomes greater as the vertical angle becomes greater. Additionally, the effort to turn the handlebar 23 needed to reduce the leaning angle of the vehicle 1 and/or the force needed for the rider to shift his or her center of gravity becomes greater as the vehicle speed becomes faster. Therefore, the control unit 80 determines a base assisting command value in such a way that the base assisting command value becomes greater as the steering torque becomes greater and the vehicle speed becomes faster.

(i) The control unit 80 determines a viscosity correction value according to, for example, vehicle speed and vertical angle speed. The control unit 80 can add a greater viscous resisting force, for example, as the vehicle speed and the vertical angle speed become faster. When referred to herein, the viscous resisting force means a resisting force that the second actuator 91 generates in a pseudo fashion against the operation of the handlebar 23 by the rider. In FIG. 10, as in (h) that is described above and (j) and (k) that will be described below, the viscosity correction value is described as being added to the electric current command value. However, the viscosity compensation has a negative coefficient, and the viscous resisting force acts as a damping force for the leaning operation.

(j) The control unit 80 determines a dynamic friction correction value according to, for example, vehicle speed and vertical angle speed. When the control unit 80 determines a dynamic friction correction value, for example, so that the dynamic friction correction value becomes greater as the vehicle speed and the vertical angle speed become faster, a dynamic frictional force can be compensated for. When referred to herein, the dynamic frictional force means a dynamic frictional force that is generated between mechanical elements on a force transmission path defined from the upper cross member 51 into which the output torque of the second actuator 91 is inputted to the left front wheel 31 and the right front wheel 32 along which the output torque of the second actuator 91 inputted into the upper cross member 51 is transmitted.

(k) The control unit 80 determines an inertia correction value according to, for example, vehicle speed and vertical angle acceleration. The vertical angle acceleration means a value that is obtained by time differentiating the input from the vertical angle sensor twice. When the control unit 80 determines an inertia correction value, for example, so that the inertia correction value becomes greater as the vehicle speed and the vertical angle acceleration become faster, an inertia of the second actuator 91 can be compensated for. It is possible to produce a steering feeling that is the same as a steering feeling that the rider obtains when he or she steers the vehicle 1 on which the second actuator 91 is not installed by compensating for the inertia of the second actuator 91.

The control unit 80 calculates a final EPL command value "b" by summing the values determined under (h) to (k) above. As this occurs, in a case where an upper limit value is set for the value of an electric current that can be inputted into the second actuator 91, the control unit 80 determines the EPL command value "b" so that an electric current of a smaller value than a maximum electric current value that is inputted into the second actuator 91 is outputted.

The control unit 80 finally controls the EPS command value "a" and the EPL command value "b" that are calculated in the ways described above so that the EPS command value "a" and the EPL command value "b" are made into a specific ratio and then transmits the EPS command value "a" to the first controller 72 of the EPS 70 and the EPL command value "b" to the second controller 92 of the EPL 90.

Specifically, the control unit 80 increases the ratio a/b of the EPS command value "a" that determines the output torque of the first actuator 71 to the EPL command value "b" that determines the output torque of the second actuator 91 as the vehicle speed increases with the physical quantity excluding the vehicle speed made constant. Additionally, the control unit 80 increases the ratio a/b as the vehicle speed increases while the vehicle speed stays within a normal speed range. The normal speed range can be set, for example, at a range from 0 km/h or faster to 200 km/h or slower.

The first actuator 71 applies a steering effort to the steering effort transmission mechanism 6 through a first power transmission path based on the value "a" calculated by the control unit 80. The second actuator 91 applies a turning effort to the link mechanism 5 through a second power transmission path that is independent of the first power transmission mechanism based on the value "b" calculated by the control unit 80. When referred to herein, the first power transmission mechanism means a mechanism for transmitting the output torque of the first actuator 71 between an output shaft of the first actuator 71 and the steering shaft 60. When referred to herein, the second power transmission mechanism means a mechanism for transmitting the output torque of the second actuator 91 between an output shaft of the second actuator 91 and the upper cross member 51. In this embodiment, the first power transmission mechanism does not share parts with the second power transmission mechanism, which allows the first actuator 71 to change the vertical angle independently of the second actuator 91, while allowing the second actuator 91 to change the vertical angle independent of the first actuator 71.

In the vehicle 1 according to the embodiment, the vertical angle can be changed separately from the rider's operating the handlebar 23 by the use of the EPL 90. When compared with a case where the EPL 90 is not installed on the vehicle 1, using the EPL 90 allows the vertical angle to be controlled even by a slight operation of the handlebar 23.

For example, when the vertical angle increases to the right, the upper cross member 51 turns counterclockwise relative to the vehicle body frame 21 when the upper cross member 51 is viewed from the rear in the front-and-rear direction of the vehicle 1. Therefore, when the vertical angle increases to the right, the EPL 90 applies a turning effort to the upper cross member 51 so that the upper cross member 51 turns clockwise when the upper cross member 51 is viewed from the rear in the front-and-rear direction of the vehicle 1 to reduce the vertical angle. On the contrary, when the vertical angle increases to the left, the EPL 90 applies a turning effort to the upper cross member 51 so that the upper cross member 51 turns counterclockwise when the upper cross member 51 is viewed from the rear in the front-and-rear direction of the vehicle 1 to reduce the vertical angle.

As described above, in a case where the vehicle speed is relatively slow, attempting to suppress the behavior that increases the vertical angle only by the EPS 70 tends to cause the rider to feel a sensation of physical disorder. Therefore, in this embodiment, the behavior that increases the vertical angle is suppressed by setting the EPL command value at the greater value in the low speed range and reducing the ratio of the output of the EPS to the output of the EPL in the high speed range. It is made difficult for the rider to feel a sensation of physical disorder in the low speed range in the way described above. As this occurs, the ratio a/b between the EPS command value "a" and the EPL command value "b" becomes relatively small. On the contrary, in a case where the vehicle speed is relatively fast, it is preferable that the vertical angle is controlled by the use of the EPS 70. Therefore, in this embodiment, the EPL command value is not set at such a great value in the high speed range. As this occurs, the ratio a/b between the EPS command value "a" and the EPL command value "b" becomes relatively great. The control unit 80 sets the EPS command value "a" and the EPL command value "b" in the ways described above, and hence, the control unit 80 increases the ratio a/b according to the vehicle speed.

In the vehicle 1 according to this embodiment, the following is meant by the statement reading "the ratio a/b is increased as at least the vehicle speed increases with the physical quantity excluding vehicle speed made constant."—The control unit 80 determines the ratio a/b according to the physical quantity such as at least vehicle speed and vertical angle. The control unit 80 may determine the ratio a/b according to the physical quantity such as steering torque and the like in addition to vehicle speed and vertical angle. Although not described above, the EPS command value "a", the EPS command value "b" or the ratio a/b of the EPS value "a" to the EPL value "b" may be set according to the acceleration of the vehicle 1.—The control unit 80 increases the ratio a/b more as the vehicle speed becomes faster with the physical quantity excluding vehicle speed made constant. For example, when comparing a state in which the vertical angle is 10 degrees and the vehicle speed is 10 km/h with a state in which the vertical angle is 10 degrees and the vehicle speed is 15 km/h, the control unit 80 sets the ratio a/b greater in the latter state. However, the physical quantities other than vehicle speed are not constant in the state in which the vertical angle is 10 degrees and the vehicle speed is 10 km/h and the state in which the vertical angle is 15 degrees and the vehicle speed is 15 km/h. Due to this, the control unit 80 may set the ratio a/b greater in the latter state than in the former state, or may set the ratio a/b greater in the former state than in the latter state or may set the ratio a/b at the same value in both the states. The command values a, b may be electric current values of electric power supplied to the first actuator 71 and the second actuator 91 or duty ratios.

(2) In the embodiment, the control unit 80 may control the ratio a/b to change gradually as the vehicle speed changes. The ratio a/b between the output torque of the first actuator 71 and the output torque of the second actuator 91 changes moderately according to the vehicle speed. Thus, it is made difficult for the rider to feel a sensation of physical disorder. In the invention, being different from the configuration described under (2) above, the ratio a/b may be set to increase in a step-like fashion as the vehicle speed increases. For example, the control unit 80 may perform control so that the ratio a/b increases at a specific gradient as the vehicle speed increases. Alternatively, the control unit 80 may perform control so that the ratio a/b changes to at least two or more values in a step-like fashion within a range of vehicle speeds from 0 km/h to a maximum speed of the vehicle. Alternatively, the control unit 80 may perform control so that the ratio a/b increases at two or more specific gradients within the range of vehicle speeds from 0 km/h to the maximum speed of the vehicle.

Alternatively, the control unit 80 may divide the range of vehicle speeds from 0 km/h to the maximum speed of the vehicle into two ranges of a low speed range and a high speed range that is higher than the low speed range. The control unit 80 may increase the output torque of the first actuator 71 as the vertical angle increases in the high speed range. As this occurs, the control unit 80 may increase the output torque of the second actuator 91 as the vertical angle increases while increasing the ratio a/b as the vehicle speed increases, or may reduce the output torque of the second actuator 91, or may leave the output torque of the second actuator 91 unchanged. The control unit 80 may increase the output torque of the second actuator 91 as the vertical angle increases in the low speed range. As this occurs, the control unit 80 may increase the output torque of the first actuator 71 as the vertical angle increases while increasing the ratio a/b as the vehicle speed increases, or may reduce the output torque of the first actuator 71, or may leave the output torque of the first actuator 71 unchanged.

The invention is not limited to the case where the range of vehicle speeds from 0 km/h to the maximum speed of the vehicle is divided into the two speed ranges. For example, the range of vehicle speeds from 0 km/h to the maximum speed of the vehicle may be divided into three speed ranges of a low speed range, a middle speed range and a high speed range. Alternatively, the range of vehicle speeds from 0 km/h to the maximum speed of the vehicle may be divided into four speed ranges of an extremely low speed range, a low speed range, a high speed range and an extremely high speed range or may be divided into five or more speed ranges. The control unit 80 may perform control so that the ratio a/b increases at a value or gradient that is appropriate to each of the divided speed ranges while increasing the ratio a/b as the vehicle speed increases.

Alternatively, the control unit 80 may divide the range of vehicle speeds from 0 km/h to the maximum speed of the vehicle arbitrarily without dividing equally the range of vehicle speeds. For example, in the case where the maximum speed of the vehicle 1 is set at 250 km/h, the control unit 80 may divide the range of vehicle speeds in such a way that 0 to 20 km/h constitutes a first speed range, 20 to 50 km/h constituting a second speed range, 50 to 90 km/h constituting a third speed range, and 90 to 250 km/h constituting a fourth speed range. The control unit 80 may increase the ratio a/b at a value or gradient that is appropriate to each of the arbitrarily divided speed ranges while increasing the ratio a/b as the vehicle speed increases.

(3) In the embodiment, when the vehicle speed stays at least within a predetermined speed range, the control unit 80 may determine the EPS command value so that the output of the first actuator 71 increases as the vehicle speed increases.

According to the configuration described under (3) above, the second steering effort (the assisting torque) to the handlebar 23 increases as the vehicle speed increases. The assisting torque to the handlebar 23 acts to cancel a gyro effect (a phenomenon in which a force is generated to cause the front wheels 3 to maintain their postures) that increases as the vehicle speed increases. This enables the rider to operate the handlebar 23 with a light operation feeling even in the high speed range. In a four-wheeled vehicle that does not lean when the vehicle turns, normally, the EPS 70 is installed in an attempt to improve the static steering torque. Thus, on the contrary to the control according to the invention, the EPS 70 is set so that a great assisting torque is inputted into the steering wheel in the low vehicle speed range. In a case where an upper limit is set for the output torque of the EPS 70, there is a situation in which when the vehicle speed becomes fast enough, the value of the EPS command value cannot be set to increase as the vehicle speed increases.

(4) In the embodiment, the vehicle 1 changes to increase or reduce the steering angle of the handlebar 23 when the vehicle body frame 21 leans while the vehicle 1 is running. In the embodiment, the vehicle body frame 21 leans in association with the steering angle of the handlebar 23. In such a case, providing both the EPS 70 and the EPL 90 enables one to compensate for the other or both of the EPS 70 and the EPL 90 to cooperate with each other to control the behavior of the vehicle 1.

(5) As described under (f) above, the control unit 80 may determine the output of the first actuator 71 according to the vertical angle. As described above, the steering effort applied by the rider to reduce the leaning angle of the vehicle becomes greater as the vertical angle becomes greater. Thus, the EPS command value "a" is determined so that the EPS command value "a" becomes greater as the vertical angle becomes greater.

(6) As described under (g) above, the physical quantity may include at least one of vertical angle speed and vertical angle acceleration, and the control unit 80 may determine an output of the first actuator 71 according to at least one of the vertical angle speed and the vertical angle acceleration. According to the configuration described under (6) above, the resistance to the leaning action of the vehicle 1 can be reduced. Namely, it is possible to determine an output of the first actuator 71 so that a behavior of the handlebar attributed to an output of the first actuator 71 by the control unit 80 does not cause the rider to feel a sensation of physical disorder when the rider causes the vehicle 1 to lean.

(7) As in this embodiment, while the vehicle 1 is running, when the vehicle body frame 21 leans to the right, the vehicle 1 may attempt to change to increase the steering angle of the handlebar 23 in a clockwise direction when the vehicle 1 is viewed from above, whereas when the vehicle body frame 21 leans to the left, the vehicle 1 may attempt to change to increase the steering angle of the handlebar 23 in a counterclockwise direction when the vehicle 1 is viewed from above.

(7) For example, when the vehicle body frame 21 leans to the right while the vehicle 1 is running, the vehicle 1 attempts to turn to the right. Therefore, the handlebar 23 also turns clockwise, attempting to turn the vehicle 1 to the right further. This characteristic of the handlebar 23 being steered further in the direction in which the vehicle 1 leans when the vehicle is caused to lean is referred to as a self-steering characteristic. The vertical angle is reduced by a centrifugal force that is applied to the vehicle 1 as a result of the vehicle 1 turning. When the embodiment including the function to control the vertical angle is applied to the vehicle 1 having the self-steering characteristic, the self-steering characteristic can preferably be strengthened or weakened according to a situation. In a situation in which both the output torques of the first actuator 71 and the second actuator 91 become zero, the rider can operate the vehicle 1 in the same way as a way in which the rider operates many normal vehicles having no such actuators.

Brush motors, brushless motors, and hydraulic devices can be adopted as the first actuator and the second actuator. The first actuator and the second actuator may include a speed reducing mechanism such as a gearbox or a link device in addition to power sources therefor.

[Link Mechanism]

Although the vehicle 1 is described as having the parallelogram link mechanism 5 installed thereon in the embodiment described above, the invention is not limited thereto. The invention can also be applied to a vehicle having installed thereon a double wishbone type link mechanism, a leading arm type link mechanism or the like.

[Acute Angle]

In the invention and the embodiment described heretofore, the acute angles mean an angle that includes 0° and that is smaller than 90°. Originally, although an acute angle does not include 0°, in the invention and the embodiment, it is understood that the acute angles include 0°. In the embodiment, the imaginary plane that intersects perpendicularly the upper axes and the lower axes of the cross members is a plane that extends rearwards and upwards. However, the invention is not limited thereto, and hence, the imaginary plane that intersects perpendicularly the upper axes and the lower axes of the cross members may be a plane that extends forwards and upwards.

[Parallel, Extend, Along]

In this description, "parallel" is defined as also including two straight lines that are inclined within a range of ±40° and that do not intersect each other as members. In the invention, when "along" is used together with a "direction" and a "member," a case is included where what follows the direction and the member is inclined relative thereto within the range of ±40°. In the invention, when a member is described as extending in a "direction," a case is included where the member extends while being inclined within the range of ±40° relative to the "direction."

[Wheels, Power Unit, Vehicle Body Cover]

The vehicle 1 according to the embodiment may include the vehicle body cover that covers the vehicle body frame. The vehicle may not include the vehicle body cover that covers the vehicle body frame. The power unit includes the power source. The power source is not limited to the engine and hence may be an electric motor.

In the embodiment described above, the center of the rear wheel 4 in relation to the left-and-right direction of the vehicle body frame 21 coincides with the center of the space defined between the left front wheel 31 and the right front wheel 32 in relation to the left-and-right direction of the vehicle body frame 21. Although the configuration described above is preferable, the center of the rear wheel 4 in relation to the left-and-right direction of the vehicle body frame 21 may not coincide with the center of the space defined between the left front wheel 31 and the right front wheel 32 in relation to the left-and-right direction of the vehicle body frame 21.

[Positional Relationship between headpipe and Side Members]

In the embodiment described above, the right side member 54, the left side member 53 and the headpipe 211 are provided in the positions that overlap one another when the vehicle body frame 21 is viewed from a side thereof. However, the headpipe 211 may be provided in a position that deflects from the right side member 54 and the left side member 53 in the front-and-rear direction when the vehicle body frame 21 is viewed from the side thereof. Additionally, the angles at which the right side member 54 and the left side member 53 are inclined relative to the up-and-down direction of the vehicle body frame 21 may differ from the angle at which the headpipe 211 is inclined.

[Headpipe]

The headpipe that supports the link mechanism may be made up of a single piece of part or may be made up of a plurality of parts. In the case of the headpipe being made up of a plurality of parts, the parts may be joined together through welding, bonding or the like. Alternatively, the parts may be joined together with fastening members such as bolts, rivets or the like. In this embodiment, while the headpipe 211 is described as making up part of the vehicle body frame 21 that supports the steering shaft 60 so as to turn, the invention is not limited thereto. The vehicle body frame may include, separately, the link support portion that supports the upper cross member and the lower cross member so as to turn in addition to the headpipe that supports the steering shaft 60 so as to turn. In the embodiment, while the single steering shaft is described as having the handlebar attached to the upper end and the tie rod connected to the lower end thereof, the invention is not limited thereto. The vehicle may have a first steering shaft and a second steering shaft that turns as the first steering shaft turns and that is a separate part from the first steering shaft. As this occurs, a configuration may be adopted in which the handlebar is attached to the first steering shaft and the tie rod is attached to the second steering shaft.

[Vehicle Body Frame Configuration: Integral or Separate Configuration; Upper End of Front Edge with Integral Configuration; Configurations of Upper and Lower Frame Portions]

In this embodiment, the vehicle body frame has the link support portion that supports the link such as the headpipe, the connecting member (the upper longitudinal frame portion), the down frame (the vertical frame portion) and the under frame (the lower longitudinal frame portion), and these constituent parts are connected together through welding. However, the vehicle body frame of the invention is not limited to the embodiment. The vehicle body frame may have the link support portion, the upper longitudinal frame portion, the vertical frame portion and the lower longitudinal frame portion. For example, the vehicle body frame may be formed to be wholly or partially integral through casting or the like. Additionally, in the vehicle body frame, the upper longitudinal frame portion and the vertical frame portion may be made up of a single member or may be made up of separate members.

[Magnitude of Acute Angle: Steering Shaft and Shock Absorbing Devices]

In the embodiment described above, the left shock absorbing device 33 and the right shock absorbing device 34 each include the pair of telescopic mechanisms. However, depending upon the specification of the vehicle 1, the number of telescopic mechanisms that the left shock absorbing device 33 and the right shock absorbing device 34 include individually may be one. In the embodiment described above, although the vehicle 1 is described as having the telescopic shock absorbing devices 33, 34 installed thereon, the invention is not limited thereto. The invention can also be applied to a vehicle on which a link type shock absorbing device is installed. In this embodiment, the acute angle formed by the turning axis of the steering shaft and the up-and-down direction of the vehicle body frame coincides with the acute angle formed by the direction in which the right shock absorbing device and the left shock absorbing device extend or contract and the up-and-down direction of the vehicle body frame. However, the invention is not limited to the embodiment described above. For example, the acute angle formed by the middle steering axis Y3 of the steering shaft and the up-and-down direction of the vehicle body frame may be smaller or greater than the acute angle formed by the direction in which the right shock absorbing device and the left shock absorbing device extend or contract and the up-and-down direction of the vehicle body frame.

In addition, in the embodiment, the middle steering axis Y3 of the steering shaft and the direction in which the right shock absorbing device and the left shock absorbing device extend or contract coincide with each other. However, the invention is not limited to the embodiment described above. When the vehicle 1 standing upright is viewed from a side thereof, the turning axis of the steering shaft and the direction in which the right shock absorbing device and the left shock absorbing device extend or contract may be spaced away from each other in the front-and-rear direction. Additionally, for example, the turning axis of the steering shaft and the direction in which the right shock absorbing device and the left shock absorbing device extend or contract may intersect each other.

Further, in this embodiment, the direction in which the right shock absorbing device extends or contracts coincides with the right steering axis Y2 of the right shock absorbing device, and the direction in which the left shock absorbing device extends or contracts coincides with the left steering axis Y1 of the left shock absorbing device. However, the invention is not limited to the embodiment described above. The direction in which the right shock absorbing device extends or contracts may not coincide with the right steering axis Y2 of the right shock absorbing device, and the direction in which the left shock absorbing device extends or contracts may not coincide with the left steering axis Y1 of the left shock absorbing device.

In this embodiment, the right front wheel and the left front wheel are supported so that their upper ends can move further upwards in the up-and-down direction of the vehicle body frame than an upper end of the down frame of the vehicle body frame. However, the invention is not limited to the embodiment. In this invention, the right front wheel and the left front wheel may be able to move upwards as high as or to a height that is lower than the upper end of the down frame of the vehicle body frame in the up-and-down direction of the vehicle body frame.

[Cross Members and Side Members]

The upper cross member may include an upper front cross member that is made up of a single part, an upper rear cross member that is made up of a single part and a connecting member that is provided between the upper front and rear cross members and that is made up of a plurality of parts. In the case of the headpipe being made up of a plurality of parts, the parts may be joined together through welding, bonding or the like. Alternatively, the parts may be joined together with fastening members such as bolts, rivets or the like.

The lower cross member may include a lower front cross member that is made up of a single part, a lower rear cross member that is made up of a single part and a connecting member that is provided between the lower front and rear cross members and that is made up of a plurality of parts. In the case of the headpipe being made up of a plurality of parts, the parts may be joined together through welding, bonding or the like. Alternatively, the parts may be joined together with fastening members such as bolts, rivets or the like.

The right side member and the left side member may each be made up of a single part or a plurality of parts. In the case of the headpipe being made up of a plurality of parts, the parts may be joined together through welding, bonding or the like. Alternatively, the parts may be joined together with fastening members such as bolts, rivets or the like. The right side member and the left side member may each include a portion that is disposed ahead of the upper cross member or the lower cross member in the front-and-rear direction of the vehicle body frame and a portion that is disposed behind the upper cross member or the lower cross member in the front-and-rear direction of the vehicle body frame. The upper cross member or the lower cross member may be disposed between the portions that are disposed ahead of and behind the right side member and the left side member.

In the invention, the link mechanism may include further a cross member in addition to the upper cross member and the lower cross member. The upper cross member and the lower cross member are so called only from their relative positional relationship in the up-and-down direction. The upper cross member does not necessarily imply an uppermost cross member in the link mechanism. The upper cross member means a cross member that lies above another cross member that lies therebelow. The lower cross member does not necessarily imply a lowermost cross member in the link mechanism. The lower cross member means a cross member that lies below another cross member that lies thereabove. Additionally, the cross member may be made up of two parts of a right cross member and a left cross member. In this way, the upper cross member and the lower cross member may each include a plurality of cross members as long as they still exhibit the link function. Further, another cross member may be provided between the upper cross member and the lower cross member. The link mechanism should include the upper cross member and the lower cross member.

The invention can be embodied in many different forms. This disclosure should be understood to provide the embodiment according to the principle of the invention. Based on the understanding that the preferred embodiments that are described and/or illustrated herein are not intended to limit the invention thereto, several embodiments are described and illustrated herein.

Several illustrated embodiments of the invention are described herein. The invention is not limited to the various preferred embodiments described herein. The invention also includes every embodiment that includes equivalent elements, modifications, deletions, combinations (for example, a combination of characteristics of various embodiments), improvements and/or alternations that those skilled in the art to which the invention pertains can recognize based on the disclosure herein. The limitative matters of claims should be construed widely based on terms used in the claims and hence should not be limited by the embodiments described in this description or the prosecution of this patent application. The embodiments should be construed to be non-exclusive. For example, in this disclosure, such terms as "preferable or preferably" and "may be or do" are non-exclusive terms and mean that "it is preferable, but the invention is not limited thereto" and "it may be or do, but the invention is not limited thereto," respectively.

DESCRIPTION OF REFERENCE NUMERALS AND CHARACTERS

1 VEHICLE
2 Vehicle main body portion
3 Front wheel
4 Rear wheel
5 Link mechanism
6 Steering effort transmission mechanism
21 Vehicle body frame
22 Vehicle body cover
23 Handlebar
31 Left front wheel
32 Right front wheel
33 Left shock absorbing device
34 Right shock absorbing device
51 Upper cross member
52 Lower cross member
53 Left side member
54 Right side member
60 Steering shaft
61 First transmission plate
62 Second transmission plate
63 Third transmission plate
64 First joint
65 Second joint
66 Third joint
67 Tie-rod
70 EPS
80 Control unit
81 Steering angle sensor
82 Steering torque sensor
83 Left wheel speed sensor
84 Right wheel speed sensor
85 Vertical angle sensor
86 Wheel-to-ground angle sensor
90 EPL
91 Second actuator
92 Second controller
211 Headpipe
212 Down frame
213 Rear frame
214 Under frame
221 Front cover 223 Front fender
224 Rear fender
225 Leg shield
226 Center cover
227 First front fender
228 Second front fender
314 Left axle member
317 First bracket
324 Right axle member
327 Second bracket
331 Left rear telescopic element
332 Left front telescopic element
341 Right rear telescopic element
342 Right front telescopic element
711 Left brake disc
721 Right brake disc
C Upper middle axis
E Upper right axis
J Upper left axis
K Lower middle axis
G Lower left axis
H Lower right axis
Y1 Left steering axis
Y2 Right steering axis
Y3 Middle steering axis

What is claimed is:

1. A vehicle comprising:
a vehicle body frame configured to lean to a right of the vehicle when the vehicle turns right and lean to a left of the vehicle when the vehicle turns left;
a right front wheel that is provided on a right of the vehicle body frame and that is able to turn about a right steering axis that extends in an up-and-down direction of the vehicle body frame;
a left front wheel that is provided on a left of the vehicle body frame and that is able to turn about a left steering axis that extends in the up-and-down direction of the vehicle body frame;
a link mechanism having a cross member that is supported to be able to turn about a link axis that extends in a front-and-rear direction of the vehicle body frame to change a relative position of the right front wheel and the left front wheel in the up-and-down direction of the vehicle body frame according to a degree to which the vehicle body frame leans;
a steering effort transmission mechanism configured to transmit a first steering effort inputted into a steering effort input unit by a rider to the right front wheel and the left front wheel;
a steering effort application device configured to apply a second steering effort to the steering effort transmission mechanism by a first actuator;
a turning effort application device configured to apply a turning effort to the cross member of the link mechanism by a second actuator to turn the cross member relative to the vehicle body frame; and
a control unit configured to control at least one of the steering effort application device and the turning effort application device to generate at least one of the second steering effort or the turning effort to suppress a behavior that increases a vertical angle, wherein
the control unit is adapted to determine an electric power steering system (EPS) command value and an electric power leaning system (EPL) command value according to a physical quantity that includes at least a vehicle speed and a vertical angle, the EPS command value determining a magnitude of output torque of the first actuator and the EPL command value determining a magnitude of output torque of the second actuator, and wherein
with the vertical angle being any other angle than 0 degrees and the physical quantity excluding the vehicle speed staying constant, the control unit increases a ratio a/b of the EPS command value "a" to the EPL command value "b" as the vehicle speed increases.

2. The vehicle according to claim 1, wherein the control unit controls the ratio a/b to change gradually as the vehicle speed changes.

3. The vehicle according to claim 2, wherein the control unit increases an output of the first actuator as the vehicle speed increases when the vehicle speed stays within at least a predetermined range.

4. The vehicle according to claim 2, wherein when the vehicle body frame leans while the vehicle is running, the vehicle increases or decreases a steering angle of the steering effort input unit.

5. The vehicle according to claim 2, wherein while the vehicle is running, when the vehicle body frame leans to the right of the vehicle, the vehicle attempts to increase a steering angle of the steering effort input unit in a clockwise direction when the vehicle is viewed from above, and when the vehicle body frame leans to the left of the vehicle, the vehicle attempts to increase the steering angle of the steering effort input unit in a counterclockwise direction when the vehicle is viewed from the above.

6. The vehicle according to claim 1, wherein the control unit increases an output of the first actuator as the vehicle speed increases when the vehicle speed stays within at least a predetermined range.

7. The vehicle according to claim 6, wherein when the vehicle body frame leans while the vehicle is running, the vehicle increases or decreases a steering angle of the steering effort input unit.

8. The vehicle according to claim 6, wherein while the vehicle is running, when the vehicle body frame leans to the right of the vehicle, the vehicle attempts to increase a steering angle of the steering effort input unit in a clockwise direction when the vehicle is viewed from above, and when the vehicle body frame leans to the left of the vehicle, the vehicle attempts to increase the steering angle of the steering effort input unit in a counterclockwise direction when the vehicle is viewed from the above.

9. The vehicle according to claim 1, wherein when the vehicle body frame leans while the vehicle is running, the vehicle increases or decreases a steering angle of the steering effort input unit.

10. The vehicle according to claim 9, wherein the physical quantity includes at least one of a vertical angle speed or a vertical angle acceleration, and wherein the control unit determines an output of the first actuator according to the at least one of the vertical angle speed or the vertical angle acceleration.

11. The vehicle according to claim 10, wherein while the vehicle is running, when the vehicle body frame leans to the right of the vehicle, the vehicle attempts to increase a steering angle of the steering effort input unit in a clockwise direction when the vehicle is viewed from above, and when the vehicle body frame leans to the left of the vehicle, the vehicle attempts to increase the steering angle of the steering effort input unit in a counterclockwise direction when the vehicle is viewed from the above.

12. The vehicle according to claim 9, wherein the control unit determines an output of the first actuator according to the vertical angle.

13. The vehicle according to claim 9, wherein while the vehicle is running, when the vehicle body frame leans to the right of the vehicle, the vehicle attempts to increase a steering angle of the steering effort input unit in a clockwise direction when the vehicle is viewed from above, and when the vehicle body frame leans to the left of the vehicle, the vehicle attempts to increase the steering angle of the steering effort input unit in a counterclockwise direction when the vehicle is viewed from the above.

14. The vehicle according to claim 1, wherein the control unit determines an output of the first actuator according to the vertical angle.

15. The vehicle according to claim 14, wherein the physical quantity includes at least one of a vertical angle speed or a vertical angle acceleration, and wherein the control unit determines an output of the first actuator according to the at least one of the vertical angle speed or the vertical angle acceleration.

16. The vehicle according to claim 14, wherein while the vehicle is running, when the vehicle body frame leans to the right of the vehicle, the vehicle attempts to increase a steering angle of the steering effort input unit in a clockwise direction when the vehicle is viewed from above, and when the vehicle body frame leans to the left of the vehicle, the vehicle attempts to increase the steering angle of the steering effort input unit in a counterclockwise direction when the vehicle is viewed from the above.

17. The vehicle according to claim 1, wherein while the vehicle is running, when the vehicle body frame leans to the right of the vehicle, the vehicle attempts to increase a steering angle of the steering effort input unit in a clockwise direction when the vehicle is viewed from above, and when the vehicle body frame leans to the left of the vehicle, the vehicle attempts to increase the steering angle of the steering effort input unit in a counterclockwise direction when the vehicle is viewed from the above.

\* \* \* \* \*